US008333645B2

(12) United States Patent
Xidos et al.

(10) Patent No.: US 8,333,645 B2
(45) Date of Patent: Dec. 18, 2012

(54) SYSTEM AND METHOD OF GAMING ON A COMPUTER SYSTEM

(75) Inventors: John Emmanuel Xidos, Sydney (CA); Vincent Joseph White, New Waterford (CA); Geoff David Gabriel, Sydney (CA); Michael Patrick Jessome, Fredericton (CA); Mark Christopher Nordine, Sarnia (CA); Ian Grosvenor Coville, Miami, FL (US); Franklin Timmons, Sydney (CA)

(73) Assignee: Techlink International Entertainment Ltd., Sydney (CA)

( * ) Notice: Subject to any disclaimer, the term of this patent is extended or adjusted under 35 U.S.C. 154(b) by 592 days.

(21) Appl. No.: 12/442,564

(22) PCT Filed: Nov. 12, 2008

(86) PCT No.: PCT/CA2008/002009

§ 371 (c)(1),
(2), (4) Date: May 22, 2009

(87) PCT Pub. No.: WO2009/062307

PCT Pub. Date: May 22, 2009

(65) Prior Publication Data

US 2010/0184508 A1 Jul. 22, 2010

Related U.S. Application Data

(60) Provisional application No. 60/987,114, filed on Nov. 12, 2007.

(51) Int. Cl.
*A63F 9/24* (2006.01)
*A63F 13/00* (2006.01)

(52) U.S. Cl. ............................... 463/11; 463/17; 463/27

(58) Field of Classification Search .................... 463/11, 463/12, 13, 17, 18, 25, 26, 27, 9, 10, 16, 463/19, 20, 21, 28
See application file for complete search history.

(56) References Cited

U.S. PATENT DOCUMENTS

| | | | | |
|---|---|---|---|---|
| 5,707,287 | A * | 1/1998 | McCrea, Jr. | 463/27 |
| 6,203,429 | B1 * | 3/2001 | Demar et al. | 463/20 |
| 6,659,461 | B2 * | 12/2003 | Yoseloff et al. | 273/274 |
| 6,719,291 | B1 | 4/2004 | deKeller | |
| 2002/0123376 | A1 * | 9/2002 | Walker et al. | 463/11 |
| 2003/0017865 | A1 * | 1/2003 | Beaulieu et al. | 463/16 |
| 2007/0040332 | A1 | 2/2007 | Noyes | |

FOREIGN PATENT DOCUMENTS

WO WO 01/57816 8/2001

OTHER PUBLICATIONS

International Search Report mailed Feb. 16, 2009 in application No. PCT/CA2008/002009.

* cited by examiner

*Primary Examiner* — Olik Chaudhuri
*Assistant Examiner* — Quovaunda V Jefferson
(74) *Attorney, Agent, or Firm* — Davidson Berquist Jackson & Gowdey, LLP; Brian Siritzky

(57) ABSTRACT

The present invention relates to a new system and method of gaming on a computer system. In particular, the invention relates to a novel method of playing games such as poker (and variations thereof) and other games where the player is provided with the opportunity to participate in a bonus round of play for an accumulated jackpot when the results of a regular round of play trigger access to the bonus round. The system and method are particularly suited for deployment on a video lottery terminal (VLT) slot machine or other computer gaming system.

44 Claims, 43 Drawing Sheets

SYSTEM AND METHOD OF GAMING ON A COMPUTER SYSTEM

RELATED APPLICATIONS

This application is the National Phase of International Application PCT/CA2008/002009 filed Nov. 12, 2008 which designated the U.S., the entire contents of which are incorporated herein for all purposes. International Application PCT/CA2008/002009 is an application claiming benefit under 35USC 119(e) from U.S. Provisional Application No. 60/987,114, filed Nov. 12, 2007. This application also claims benefit of U.S. Provisional Application No. 60/987,114, the entire contents of which are also incorporated herein for all purposes.

FIELD OF THE INVENTION

The present invention relates to a new system and method of gaming on a computer system. In particular, the invention relates to a novel method of playing games such as poker (and variations thereof) and other games where the player is provided with the opportunity to participate in a bonus round of play for an accumulated jackpot when the results of a regular round of play trigger access to the bonus round. The system and method are particularly suited for deployment on a video lottery terminal (VLT) slot machine or other computer gaming system.

BACKGROUND OF THE INVENTION

Poker is a highly popular game that is played in a multitude of formats across the globe. In particular, live poker tournaments utilizing the "Texas hold 'em" style of game play have become well known to millions of people through television tournaments. In addition, millions of people play this type of poker both over the Internet and through various forms of poker game that are available on VLT terminals.

This style of poker deals each player an initial two cards down (the "hole" cards). A total of five additional "community" cards are dealt in three stages to each player, known as the "flop" (the first three community cards), the "turn" (the fourth community card) and the "river" (the fifth community card). Players bet after each round of cards and must either make or match bets in order to remain in the game before receiving another card. After all five community cards have been dealt, if there are at least two remaining players, these remaining players reveal their cards (termed a showdown). The player who can make the best hand out of five of their seven cards wins the hand. If the five best cards are the community cards or there is a tie between player hands, no player wins that hand and the pot is split between the remaining players.

The popularity of televised poker games has grown in part as a result of the producers of a poker tournament usually displaying to the television viewers the relative strength of each player's hand as it is being played out together with the total size of the pot. Specifically, the relative strength of each player's hand is displayed as a percentage probability of a player winning the hand and is calculated based on both the hole and community cards for each player. The percentages are visible only to the television viewers and are updated after each round of cards for each player remaining in the hand.

That is, by calculating the probability of a player's hand winning and the total value of each bet and the total pot size makes the televised game more interesting to watch. In addition, the display of probabilities also serves as a learning tool to many players or would-be players to learn the game.

At a live tournament, either at a single physical card table or those played over the Internet, each player will be playing against individuals. As a result, the size of the pot is highly variable making the game very interesting and challenging to players.

Many players who are interested in poker, however, are intimidated by these player-on-player games and seek to gain the poker experience without playing against other players. Thus, while many players enjoy playing this style of live-poker, many choose not play these forms of player-on-player poker.

In the corresponding Slot or VLT games, players merely play against a computer dealer (the house). In this style of play, both the player and the house are dealt their hole cards on which the player makes their bet. The community cards are dealt and either the house or the player makes the best hand. If the player makes the best hand, he is credited with the pot, otherwise, the house wins the pot as may be calculated by a pay table displayed to the player. The pay table is designed to provide a theoretical return to player (RTP) of approximately 90-96%.

While both styles of play are popular (live and VLT), there has been a need for a VLT style game that provides further incentive and opportunity to a VLT or computer player to participate in more interesting and exciting forms of play that are more akin to the table or player-on-player forms of poker.

In particular, there has been a need for a form of bonus round play that a player can access where they have access to a number of bonus pots.

SUMMARY OF THE INVENTION

In accordance with the invention, systems and methods of gaming are provided that allow a player to access bonus rounds of play during a wagering game so as to play for gaming credits accumulated from first levels of play from the bonus round of play.

In a first embodiment, the invention provides a gaming system enabling a player to play a betting game against a computer dealer, the system enabling gaming credits to accumulate in at least one bonus pot that the player may subsequently access during game play, the system comprising:

- a computer game allowing a player to bet on the outcome of the betting game, the computer game having:
  - a gaming credit system that a) awards game credits to the player based on the outcome of a betting game during a first level of play; and b) awards gaming credits to a bonus pot based on the outcome of a betting game during a first level of play;
- wherein a player may play for credits in one or more of the bonus pots by accessing a bonus round of play when the outcome of a first level of play matches pre-determined access criteria for the bonus round in accordance with a random number algorithm and wherein bonus pot credits are awarded to either the player or a house proprietor based on the outcome of the bonus round of play.

In various embodiments, the betting game is an electronic card game using a deck of cards. Pre-determined access criteria to the bonus round of play is based on matching numbers or symbols of specific cards played during the first round of play with a randomly selected pattern or mathematical total of card values determined by the computer system. The number of bonus pots is preferably greater than one and in one embodiment, only one bonus pot may be accessed from one specific round of first level of play.

Gaming credits awarded to the bonus pot are preferably based on the total amount bet during the first level of play and a paytable and are awarded to the bonus pot if the computer dealer wins the first level of play. The bonus round of play is, in one embodiment, the same game as the first level of play and does not include betting.

If the player wins the bonus round of play, the credits in the bonus pot are awarded to the player and the bonus pot is cleared of credits. If the dealer wins the bonus round of play, the credits in the bonus pot are awarded to the house and the bonus pot is cleared of credits.

In various embodiments, the computer game allows at least two betting rounds during the first round of play.

In other embodiments, a plurality of players can independently play the computer game on a network on separate computer systems and wherein the system further includes a network jackpot accessible to all players on the network based on network jackpot access criteria. Normally, the network jackpot access criteria is statistically more difficult to meet during a first round of play than bonus pot access criteria during a first round of play.

In other embodiments, the invention provides methods of gaming.

More specifically, in one embodiment, the invention provides a gaming system method enabling a player to play a betting game against a computer dealer on a computer system to accumulate game credits in at least one bonus pot that the player may subsequently access comprising the steps of:

- enabling a player to play a betting game and bet on the outcome of the betting game on a computer;
- awarding game credits to the player and the at least one bonus pot based on pre-determined odds for different game outcomes during a first level of play; enabling a player to play for game credits in one or more of the at least one bonus pots by accessing a bonus round of play when the outcome of a first level round of play matches pre-determined access criteria for the bonus round of play in accordance with a random number algorithm; and,
- awarding bonus pot game credits to the player or a house proprietor based on the outcome of the bonus round of play.

In yet another embodiment, the invention provides a gaming system method enabling a player to play a betting game against a computer dealer on a computer, the system enabling gaming credits to accumulate in at least one bonus pot that the player may subsequently access during game play, the method comprising the steps of:

- providing a computer game allowing a player to bet on the outcome of the betting game, the computer game having a gaming credit system;
- awarding gaming credits to the player based on the outcome of a betting game during a first level of play;
- awarding gaming credits to a bonus pot based on the outcome of a betting game during a first level of play;
- enabling a player to play for gaming credits in one or more of the bonus pots by accessing a bonus round of play when the outcome of a first level of play matches predetermined access criteria for the bonus round in accordance with a random number algorithm;
- awarding bonus pot credits to either the player or a house proprietor based on the outcome of the bonus round of play.

In other embodiments, the betting game method is an electronic card game using a deck of cards. The pre-determined access criteria to the bonus round of play is preferably based on matching numbers or symbols of specific cards played during the first round of play with a randomly selected pattern or mathematical total of card values determined by the computer. Gaming credits are awarded to the bonus pot if the computer dealer wins the first level of play.

In other embodiments of the method, the bonus round of play is the same game as the first level of play and does not include betting. If the player wins the bonus round of play, the credits in the bonus pot are awarded to the player and the bonus pot is cleared of credits. If the dealer wins the bonus round of play, the credits in the bonus pot are awarded to the house and the bonus pot is cleared of credits.

In yet another embodiment, the method enables a plurality of players to independently play the computer game on a network on separate computer systems and wherein the system further includes a network jackpot accessible to all players on the network based on network jackpot access criteria.

BRIEF DESCRIPTION OF THE DRAWINGS

The invention is described by the following description and with reference to the drawings in which.

DETAILED DESCRIPTION OF THE INVENTION

In accordance with the invention, various poker games (hereafter the "games" or singularly the "game") are described in which a player is provided with the opportunity to participate in a bonus round of play for an accumulated jackpot when the results of a regular round of play trigger access to the bonus round. While described in the context of poker and blackjack games, the system and method may be adapted for other games including poker and blackjack variations and other known card games and the like, wherein the methods as described below may be implemented. In this description, a player is a person who interacts with a computer system on which the game is supported. The dealer is a computer representation of a live dealer who is acting on behalf of the "house" such as a casino or other gaming proprietor. Credits are computer representations of value such as monetary amounts, and/or goods and services tokens. Credits, when awarded to a player may be exchanged for money in various embodiments or other goods and services. Credits, when awarded to the dealer, are first transferred to a showdown pot (explained below) and may thereafter be awarded to the house or back to the player.

Specifically, the game is deployed using a computer system such as a video lottery terminal (VLT), slot machine, mobile gaming device, online computer gaming system that allows a number of additional pots to both accumulate and be played for. The system is described herein in the context of a VLT.

Like other forms of poker games, in its main embodiment, the subject game is a poker game that utilizes a standard deck of 52 playing cards with no joker or wild cards. The object of the game is to create a poker hand using the best five cards while beating your opponent's hand (the dealer or house) for a pay table win (best hand to a royal flush and thus win the "hand" pot based on the pay table) or to qualify and play for other pots. In the context of this description, these additional pots are referred to as showdown pots. For the purposes of this description, there are three showdown pots. Variations in the games may include the addition of jokers or wild cards and/or a larger or smaller number of showdown pots as understood by those skilled in the art.

A-Texas Hold 'Em

Figure 1:
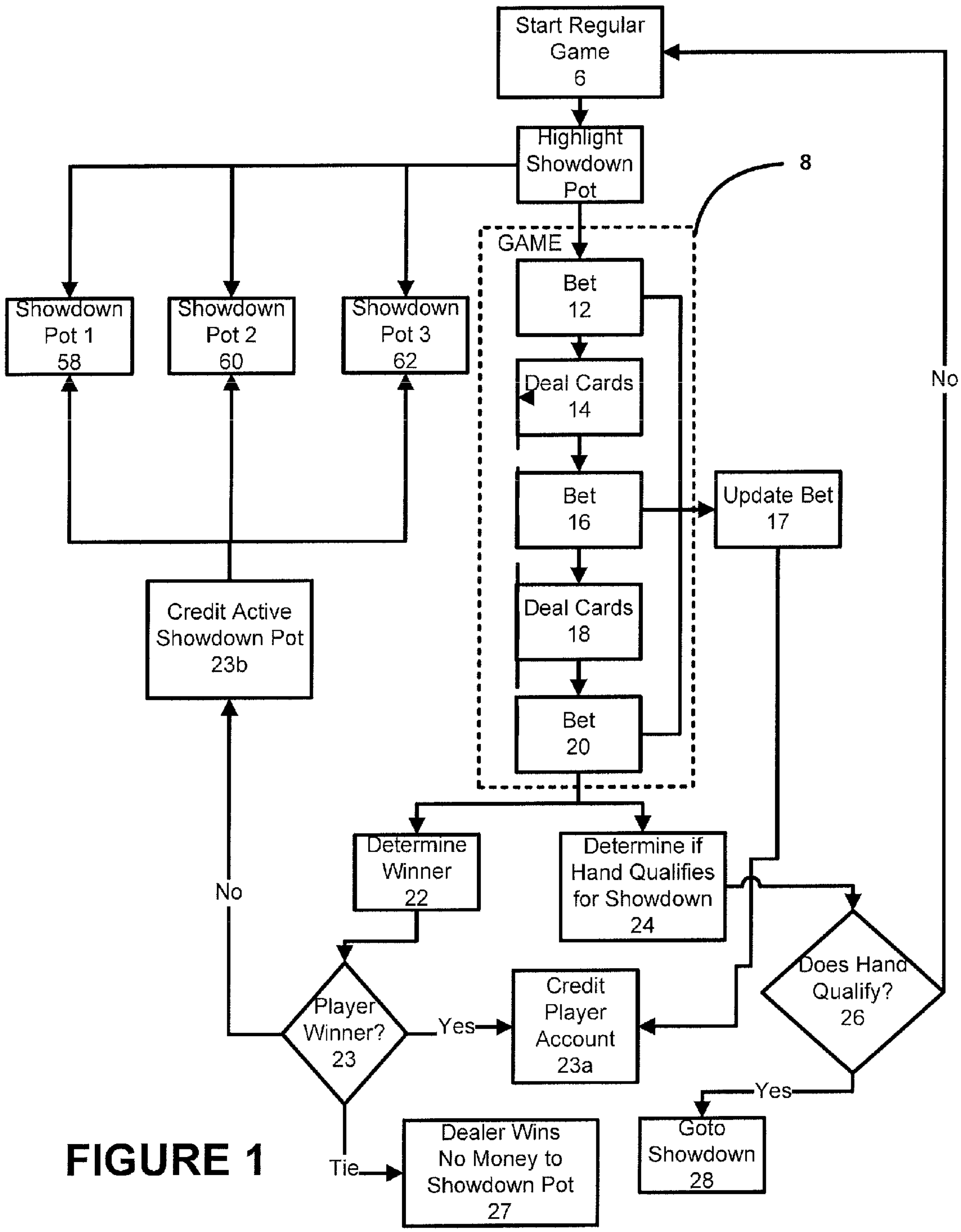
FIG. 1 is a flow chart showing the process of the invention in accordance with one embodiment.
Figure 1A:
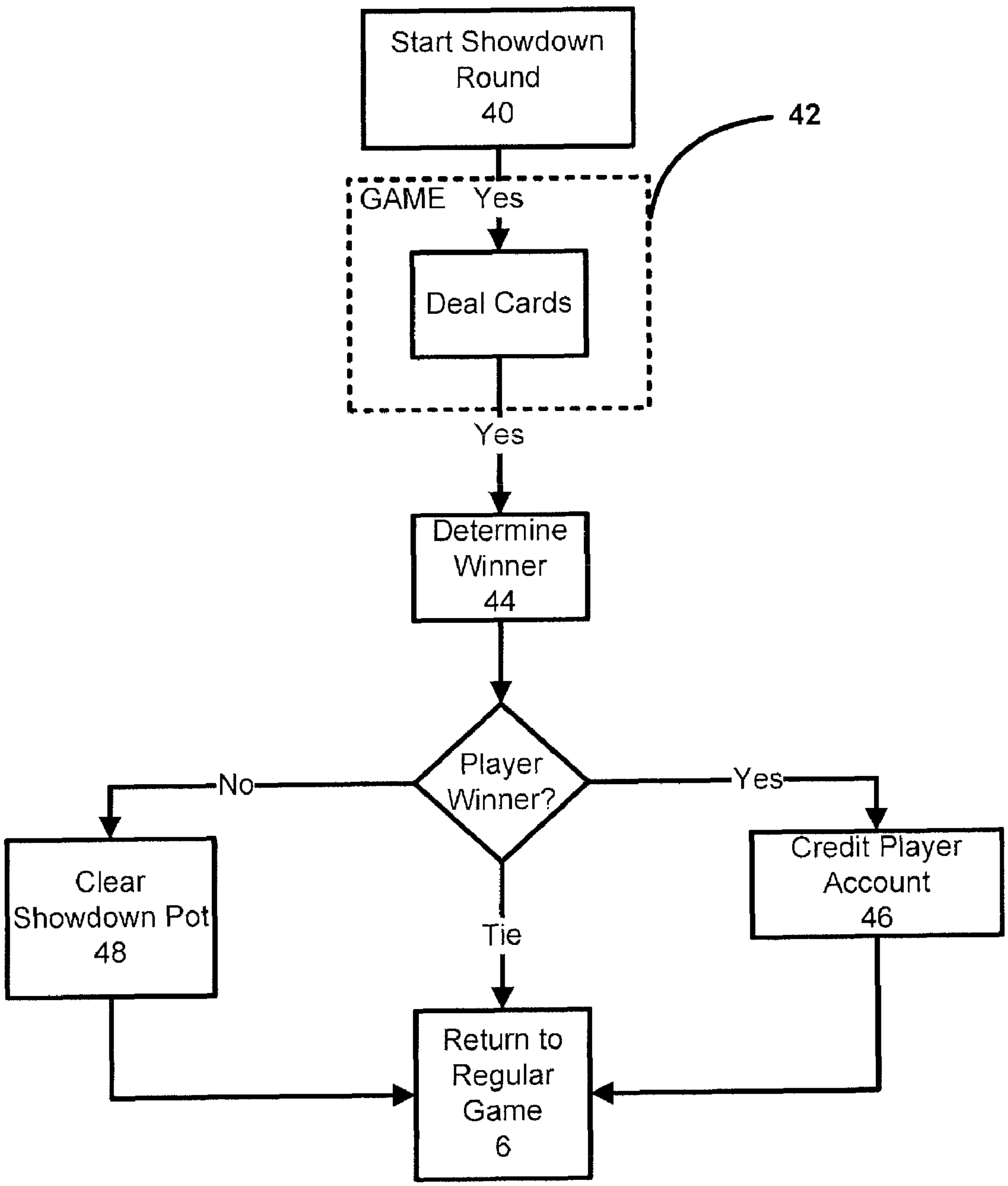
FIG. 1A is a flow chart showing the process of a showdown round in accordance with one embodiment of the invention.
Figure 2:
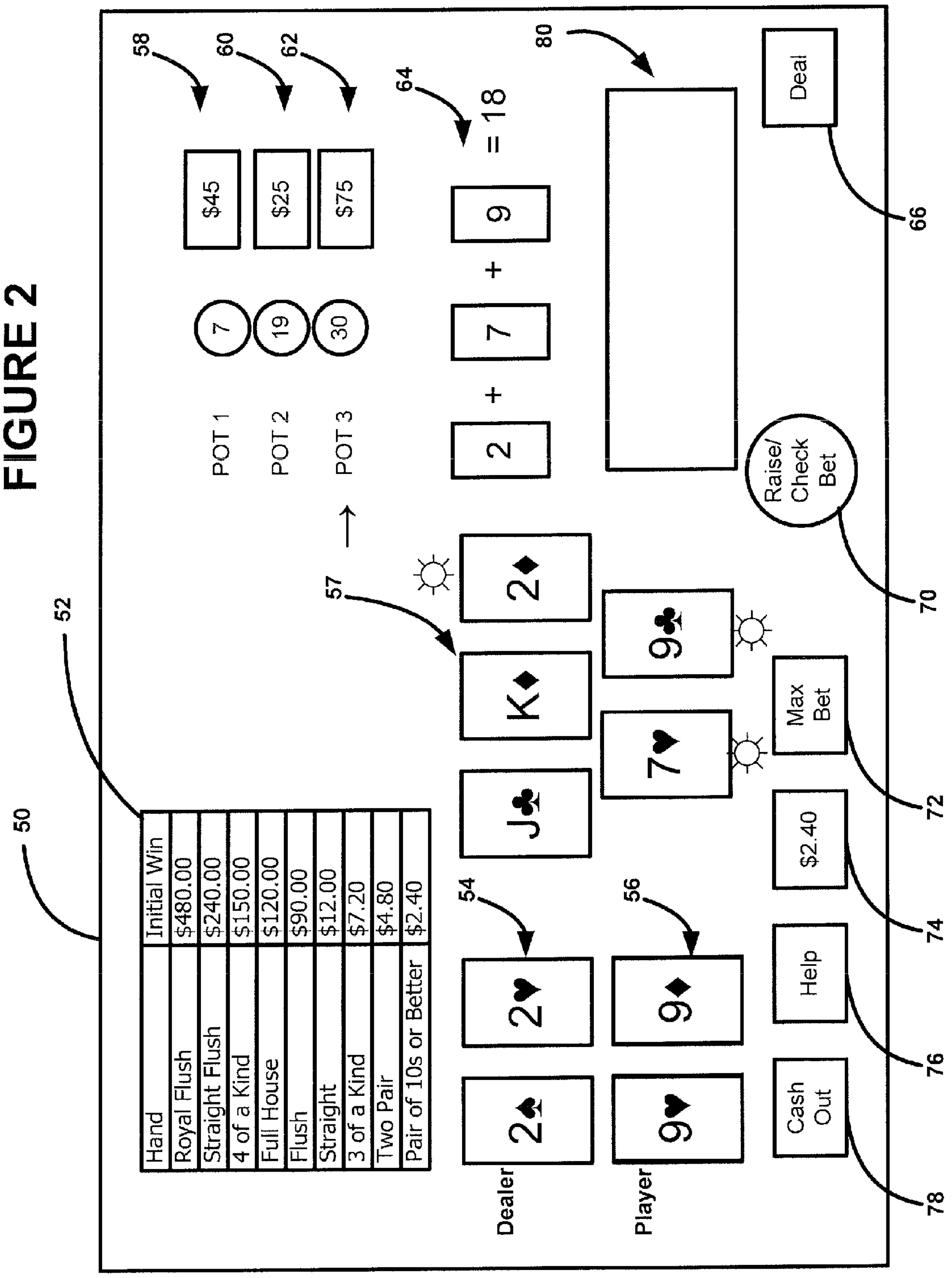
FIG. 2 is a representative display of a game in accordance with a Texas Hold'em embodiment of the invention.

The invention is described initially in the context of a Texas Hold 'em variation of poker and with reference to FIGS. 1, 1A and 2. FIG. 1 is a flow chart showing the general process of the invention, FIG. 1A is a flow chart showing the process of a showdown round (explained below) and FIG. 2 is a representative display of a game in accordance with a Texas Hold 'em embodiment of the invention.

As shown in FIG. 1, at the start of play of a regular game 6, a player makes an initial bet 12 and the player and dealer are dealt cards 14. The player may then increase their bet 16 and the pay table displayed to the player is updated based on the size of the player's bet 17. Further cards are dealt 18 and further betting 20 may take place.

Generally, as is known in the art for VLT games, the pay table will award different amounts based on the winning hand. For example, as is common in the industry, player winning hands including high card, high pair and two pair, will only award the player a percentage (typically ½) of their total wager whereas if a player's winning hand is three-of-a-kind to a royal flush, the pay table will award the player a representatively higher amount than the wager.

As shown in FIG. 2, a representative display and interface 50 for a Texas Hold 'em style of game includes a pay table 52, dealer hole cards display 54, player hole cards display 56, community cards display 57, showdown pot 1 display 58, showdown pot 2 display 60, showdown pot 3 display 62, showdown pot qualification display 64, "Deal" button 66, "Max Bet" button 72, "Bet" button 74, "Help" button 76, "Cash Out" button 78 and message display 80.

After the hole and community cards have been dealt in the appropriate sequence as described above and all bets 20 have been completed, the system will determine the winner of the game. Importantly, the last three community cards are highlighted for reasons as explained below.

In other games, variations in the cards and betting rounds may be allowed as shown by the dashed arrow in FIG. 1.

Showdown Pots

During successive rounds of play (regular game), showdown pots are grown over time and a player in accordance with the method described below may eventually gain access to a showdown pot and play to win the amount in a showdown pot.

By way of example, the showdown pots are sequentially number 1-3 (reference numerals 58, 60, 62) and the amounts that have accumulated in each pot are displayed to the player. For each successive hand that is played, one of the three showdown pots is highlighted (Pot 3 in FIG. 2) and considered to be active. Thus, in one embodiment, as each hand is played, each of the three showdown pots is sequentially activated in the following sequence: 1, 2, 3, 1, 2, 3 . . . . The highlighted showdown pot becomes the active pot for a given hand. The amount of money displayed in the active showdown pot would be played for in the event that a bonus round is triggered as will be explained below.

Adding to the Showdown Pot(s)

The money in each showdown pot(s) accumulates each time the dealer beats the player in a regular game with a winning hand normally including any one of the following hands: high card to a royal flush. In the event of a dealer win with one of these hands in a regular game, the amount highlighted in the pay table for that particular hand is added to the active showdown pot (namely 1, 2 or 3). For example, if for a given player bet of $1, the pay table indicates a payout of $3 for a three-of-a-kind and the dealer wins with that hand whilst showdown pot 2 is activated, $3 would be added to showdown pot 2.

Qualifying for a Showdown Round

For the purposes of description by way of a representative example, a player qualifies to play one of the three showdown pots whenever the last three marked community cards sum up and match one of three numbers randomly generated for each showdown pot. The randomly generated numbers can be any whole number from 6 to 33 (as explained in greater detail below). Random numbers will generally not be generated and displayed for a showdown pot if there is no money in the showdown pot.

Thus, as shown in FIG. 1, after the cards and betting rounds of the game 8 have been completed, the system will determine the winner of the game 22. If the player is the winner of the hand, the player's account 23*a* is credited by the amount calculated by the pay table and the player's bet 17. If the player is not the winner 23*b*, the active showdown pot 58, 60 or 62 is credited by the amount calculated by the pay table and the player's bet 17.

At the same time, the system will determine if the regular game qualifies for a showdown round 24. The ability to access the showdown round is not dependent on the player winning the particular regular game.

If the regular game hand qualifies for the showdown round 26, the showdown round display is activated 28. If the regular hand game does not qualify for the showdown round, the showdown round display is not activated and regular game play 6 is continued.

Ways of Winning

As noted, credits (to the player or showdown pots) are won are based on the pay table and the amount wagered as well as the amount won during the showdown round (accumulated showdown pots).

Regular Game Pay Table Wins

As noted above, the system displays a pay table that lists win events from high card to a royal flush. In order to qualify for an immediate pay table win, the player must beat the dealer with one of the pay table win events (high card to a royal flush). The win event and amount is highlighted in the game's pay table. In the event of a tie hand there is no player win and the player's wager is deducted and there is no addition to the showdown pot 27.

The following is an example of game play:

A player makes an initial wager from $0.10 to $2.50. $2.50 is assumed to be maximum bet allowed for the game. The player initially bets $1.

- The next showdown pot (this could be selected sequentially or randomly) of the three showdown pots is highlighted and made active for this hand.
- The player presses a "Deal" button 66 such that two hole cards are dealt to both the player 56 and the dealer 54. The player's two hole cards are revealed face up while the dealer's two hole cards and the five community cards 57 remain face down.
- The system generates 3 random pot numbers that are displayed in each of the showdown pot areas 58, 60, 62. For example, pot 1 may display 7, pot 2 may display 19 and pot 3 may display 30.
- The player's current card percentage that shows the calculated chance of winning based on the player's cards may be displayed.
- The player may be allowed to raise or double their bet 70, or, if the bank is too low to double their bet, they can add what they currently have in the bank. For example, if a player starts with $1.25 in the bank the player may make a bet of $1 leaving $0.25 in the bank. Accordingly, they can only raise their bet by $0.25 or add more money to the bank.
- The pay table automatically adjusts if the player raises or doubles their bet. Note that in one embodiment, if the player's initial wager is higher than $1.20 and a "Raise" button is pressed the bet may be limited to the initial wager if a pre-set maximum bet is implemented.
- Once the player presses the "Raise" or "Check" button 70, the first three community cards as well as the dealer's hole cards are revealed.
- Percentages may be updated on both the player's and dealer's hole cards indicating the best potential hand.
- The "Deal" button display changes to a "Play Turn" button 66. Once pressed the fourth card (ie the turn card) is revealed and new percentages are updated for both the player and dealer (Note: in various embodiments of the invention, the buttons used to provide player input may be physical buttons or touch screen buttons that have a fixed or variable display as known to those skilled in the art).
- The "Play Turn" button then changes to a "Play River" button 66. Once pressed the fifth and final community card (ie the river card) is revealed.
- The system highlights the last three community cards as cards that can qualify the player to play for one of the three showdown pots.
- The system then checks for the following events:
  - Did the player have a winning pay table event? If so, add the corresponding amount from the pay table to the player's credit 23*a*.
  - Did the dealer have a winning pay table event? If so, add the corresponding amount from the pay table to the active showdown pot 23*b*.
  - Did the sum of the final three marked community cards match one of the random numbers generated in one of the showdown pots? If so, the player qualifies for a "showdown round" 28.
- The showdown round is described in FIG. 1A.

Showdown Round Qualification and Method

The showdown round is a free game and is triggered whenever the three final community cards for the last hand sum up and match one of the three randomly generated pot numbers (6 to 33). For example, if the last three community cards are a two, seven and nine, the face value of these cards total 18 (FIG. 2). Thus, if one of the three random numbers is 18, a showdown round is triggered. For the purpose of illustration, an ace is 11, a face card, 10 and all other cards, their face value.

Accordingly, the possible totals of three cards from a deck would be 6 (3 twos) to 33 (3 aces). As shown in FIG. 2, a showdown round in this example is not triggered as none of the three random numbers is 18.

In an alternate embodiment, rather than generating random numbers that are related to each pot, the CPU generates, random sets of three symbols (eg. Spades, Clubs, Hearts, Diamonds) according to a random number algorithm. The set of symbols are then associated, one set of three per pot. The showdown round is triggered whenever the symbols (Spades, Clubs, Hearts, Diamonds) match the three randomly generated set of three symbols relative to the active pot. For example, if the last three community cards are Spades, Hearts, Hearts and if the active pot has a randomly generated set of symbols Spades, Hearts, Hearts, then the showdown round is triggered. If a pot that is not active has Spades, Hearts, Hearts, then the showdown round is not triggered. If the community card symbols do not match the symbols associated with the active pot, then the showdown round is not triggered.

In another embodiment, rather than generating random numbers or random symbols that are related to each pot, the active pot will find a match, triggering the qualification for the showdown round, if the three community card symbols are of the same symbols (same suit) and match the symbol associated with the pot that is active. The symbols for each pot could be static (always the same for each hand) or they could be dynamic (randomly changing for each hand). In this case, the showdown round is triggered whenever the symbols (Spades, Clubs, Hearts, Diamonds) match the three community cards and this matches the symbol associated with the active pot. For example, if the last three community cards are Hearts, Hearts, Hearts and if the active pot has a Hearts symbol, then the showdown round is triggered. In this case, if a pot that is not active has the Hearts symbol, then the showdown round is not triggered. If the last three community card symbols match, but do not match the symbol associated with the active pot, then the showdown round is not triggered. If the community card symbols do not match, then the showdown round is not triggered.

Showdown Round is Triggered

As shown in FIG. 1A, triggering the showdown round 40 initiates a single free round that pits the player against the dealer in a "heads-up" poker hand 42 (or other game). The object of the showdown round is to beat the dealer and win the active accumulated showdown pot. For example, if the showdown pot highlighted is the number 3 pot and the number 3 pot has $75 displayed; the player will play a single hand against the dealer for $75. In this showdown round, the hand is played as in other rounds except that no betting takes place. After the hole and community cards are played, the system determines which hand wins 44. If the player beats the dealer, the amount being played for in the active showdown pot (Pot 1, 2 or 3) is awarded to the player 46. The pot is then reset to zero. If the dealer beats the player, the amount in the active showdown pot (Pot 1, 2 or 3) is cleared (for the credit of the house) and reset to zero 48. In the event there is a tie hand, the highlighted showdown pot remains at the current amount and is not awarded to the player or cleared (reset to zero).

After a showdown round, regular game play 6 resumes as above.

Random Numbers for Showdown Pots

In one embodiment, the random numbers are generated and displayed in each pot. Prior to being displayed, the system will determine if two or more of the pots have the same number. If two or more numbers are the same, the system will regenerate random numbers for all pots until all numbers are different. In other embodiments, however, this may not be the case, thus allowing more than one pot to be played for in the bonus round. Another treatment could be that they get summed for a larger pot.

The number of showdown pots can also be varied in various embodiments.

Frequency of Win for Each Showdown Pot

The frequency of triggering a particular showdown pot can be made to be equal or different by adjusting the pool of numbers that may be used to gain access to a showdown round. For example, if each showdown pot can be entered by each pot allowing all twenty-eight numbers between 6 and 33 as potential numbers, the chances of triggering any particular showdown pot would be equal.

However, in a further embodiment, in order to make the game a more exciting gambling game to a player, the system has different amounts of numbers available in each pot, that is less than twenty-eight numbers. That is, by having a reduced set of numbers for a given pot that allow access, the frequency with which the sum of the final three community cards will match the random number is reduced, thus making a particular pot more difficult to win but simultaneously allowing larger amounts to accumulate within that showdown pot. The particular way in which the match between the community cards (or others) and the random numbers can be adjusted to alter the trigger frequency as understood by those skilled in the art.

Other System Attributes

Texas hold ’em games typically have no inherent house advantage. That is, games played on the casino table do not have the usual house advantage on each game played. Rather, the casino (or other proprietor) will obtain their percentage from the proceeds of the players at the start of the game.

Typically, card game behavior is not applicable to a VLT or slot machine type game because the return-to-player (RTP) is typically in the range of 97% whereas the RIP for a VLT may only be in the range of 90-96%. With the introduction of a bonus structure as described above, popular card games or table games can be made to conform to the typical RTP of a VLT or slot machine whilst giving the player an extra degree of satisfaction that they are playing for bonus amounts. As such, the subject system becomes suitable for gaming in lotteries, casinos, online gaming, mobile gaming, regular card games and so on.

In other words, this game concept enables the player to play against an opponent, in this case the dealer (the computing device) where sometimes the player wins and sometimes the dealer wins. However, rather than losing all that the dealer has won in a given round, the player is potentially given a second chance to win back at least some of the dealer's winnings that accumulates in the showdown pots. From a motivation perspective, in one sense, the player wants to lose to the dealer during the early stages of play such that the showdown pots will grow but then wants, at a later stage of play, to have the dealer have losing hands when a showdown round is reached and the showdown pots are larger.

A still further embodiment is to implement the above system as a multi-player game, where the trigger to the showdown round is not just local to the player's gaming machine, rather, can be triggered by an event on another player's gaming machine (explained in greater detail below).

Other Games

In further embodiments of the invention, other games in which the showdown round can be played are described.

B-“Let it Ride” Game

With reference to FIGS. 3-8 a “Let it Ride” game is described. A typical display 50 for this game on a VLT type display is shown. The display includes a pay table 52, dealer cards display 54, player cards display 56, showdown pot 1 display 58, showdown pot 2 display 60, showdown pot 3 display 62, showdown pot qualification display 64, deal button 66, “Let it ride” button 68, “Take-out” button 70, “Max Bet” button 72, “Bet” button 74, “Help” button 76, “Cash Out” button 78 and message display 80.

As described herein, this game is a variation of “Let it Ride” poker that allows the player to qualify both a pay table win if they beat the games pay table or qualify and play for one of the three accumulated showdown pots when the player qualifies for a showdown round by predetermined qualification criteria. In the context of this description, qualification for the showdown round is realized if the sum of the last three community cards (ie. the last three dealer cards) match one of the randomly drawn pot numbers (6 to 33) as described.

Figure 3:
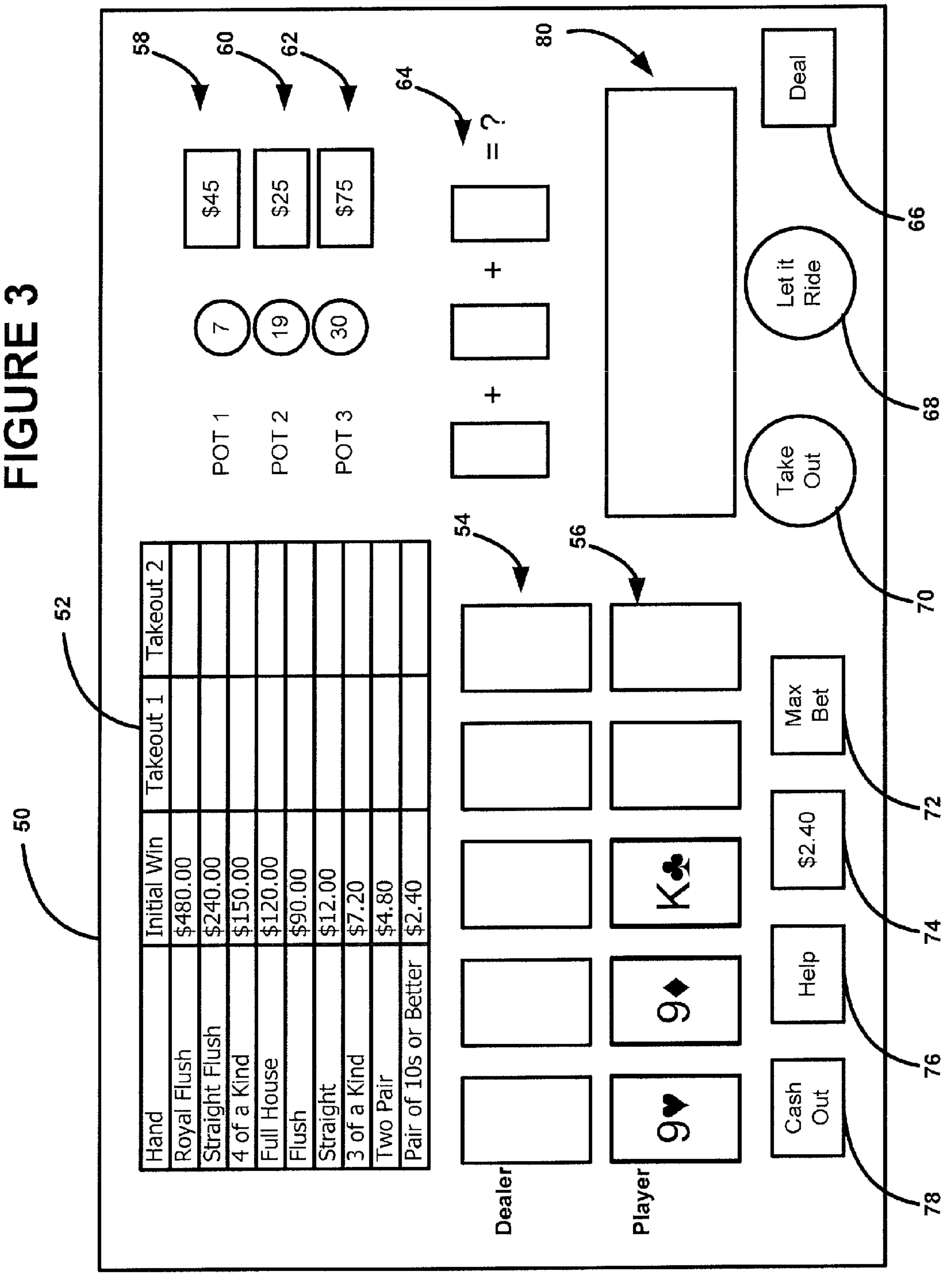
FIGS. 3-8 are representative displays of a game and game process in accordance with a "Let it Ride" embodiment of the invention.

Play generally proceeds as follows:

The player makes an initial wager selected from a number of pre-set wages such as: $2.40, $2.10, $1.80, $1.50, $1.20, $0.90, $0.60 or $0.30. In this case, a bet $2.40 is made and displayed 74 to the player. The pay table is updated to reflect the pay out based on the initial wager. At this time, the system also randomly selects three numbers ranging from 6 to 33 and assigns one to each of the showdown pots where they are displayed 58, 60, 62. As shown in FIG. 3, and by way of example, these are 7, 19 and 30 respectively. The value of each showdown pot as determined by previous rounds is also displayed.

The player presses the deal button and three cards are dealt and revealed to the player (FIG. 3).

The player now has one of two options namely pressing the “Let it Ride” button 68 or “Take out” button 70.

Figure 4:
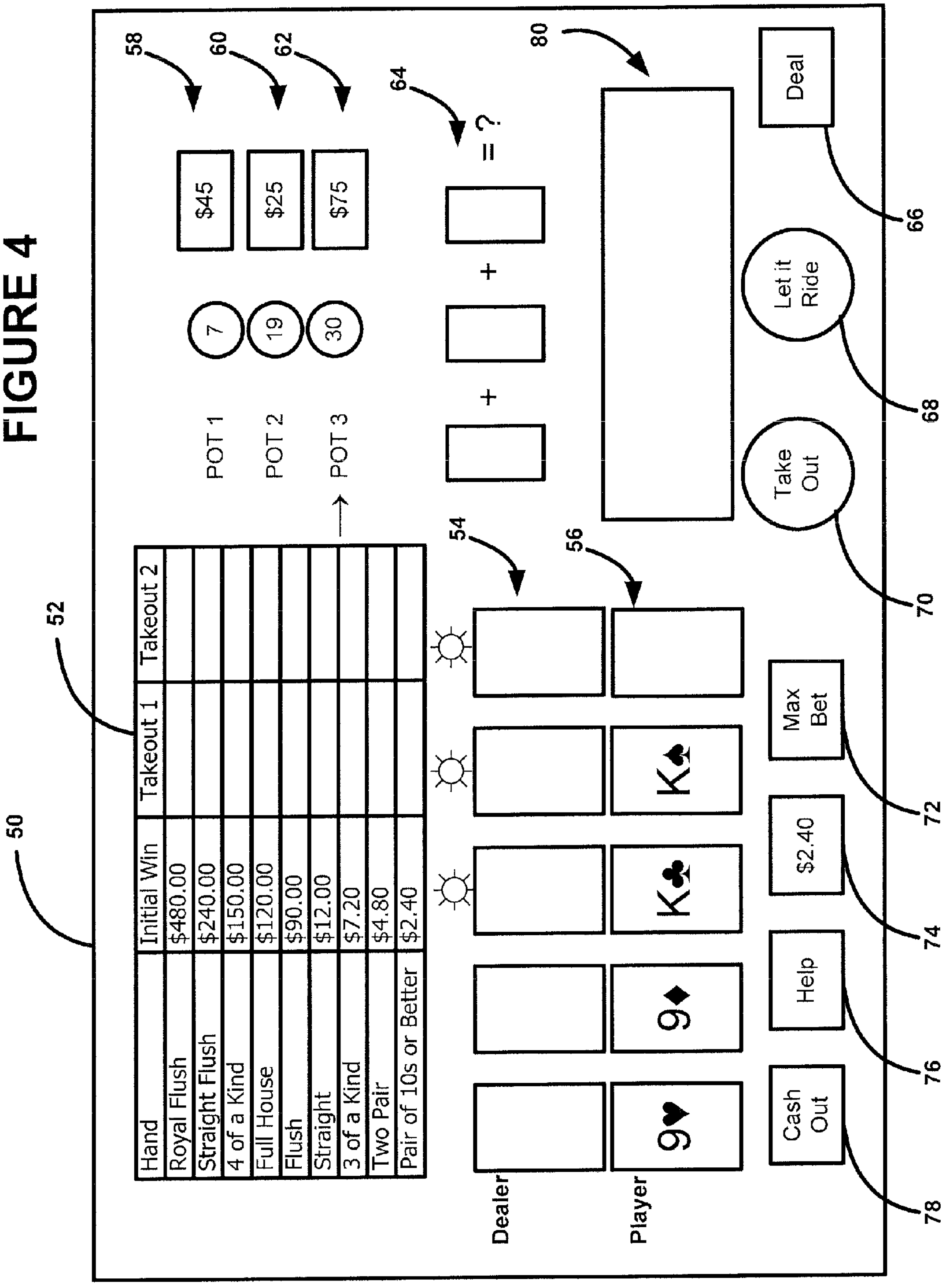

Selecting the “Let it Ride” button will continue the game with the current bet and reveal the fourth player card (FIG. 4).

Alternatively, selecting the “Takeout” button will continue the game revealing the fourth player card but allowing the player to take back ⅓ (or other percentage) of their initial wager in which case the pay table would be updated in the Takeout 1 column to reflect new pay table values based on the lower wager.

Once the fourth player card is revealed the player now has the same option as before to “Let it Ride” or “Takeout”.

Figure 5:
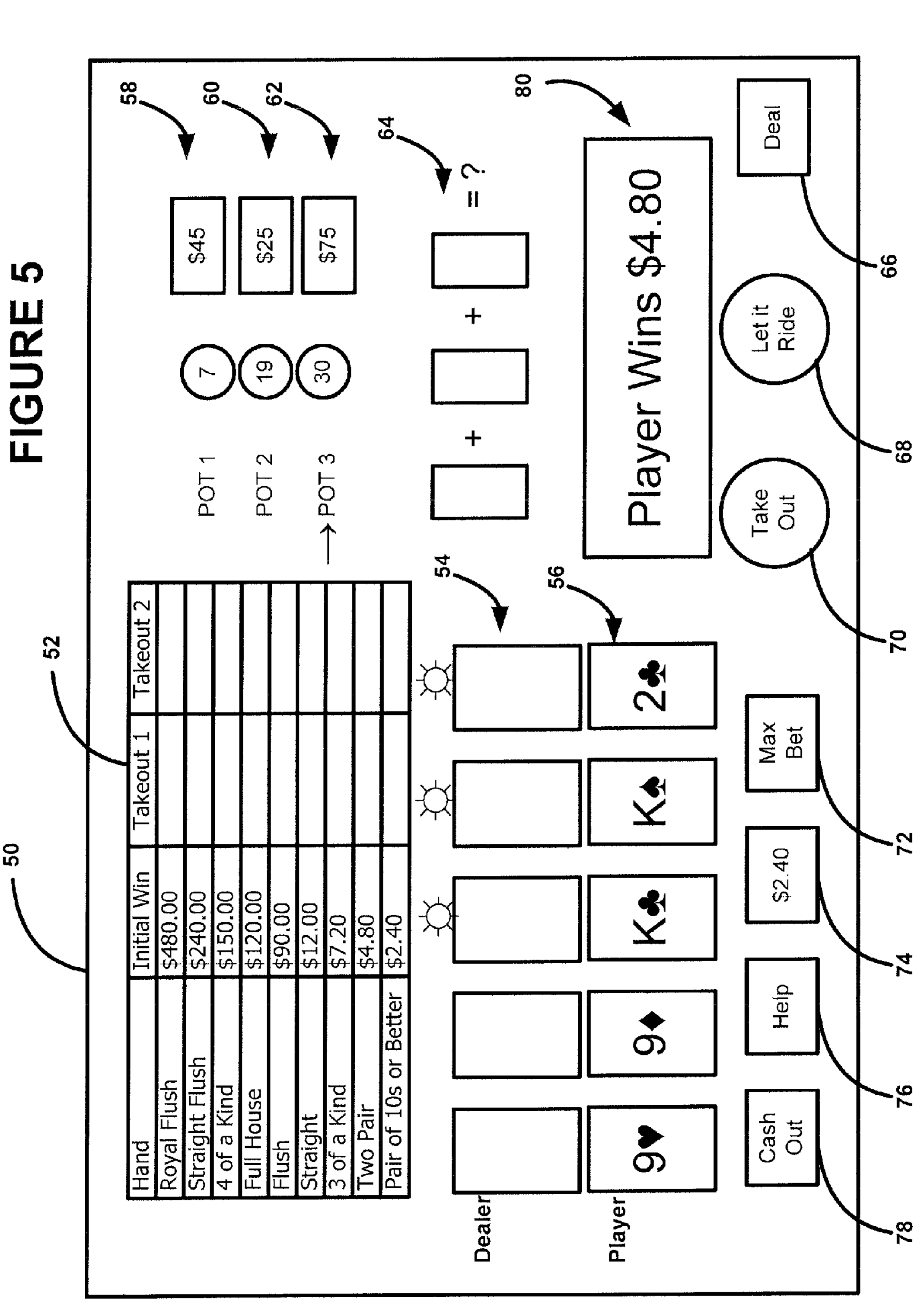

Selecting the “Let it Ride” button will continue the game with the current bet while revealing the fifth and final player card (FIG. 5).

Pressing the “Takeout” button will continue the game revealing the fifth and final player card but allowing the player to take back another ⅓ of their initial wager again resulting in the pay table values being updated in the Takeout 2 column (not shown).

The player's hand is evaluated with respect to the pay table and any credits, if applicable, are awarded to the player.

Figure 6:
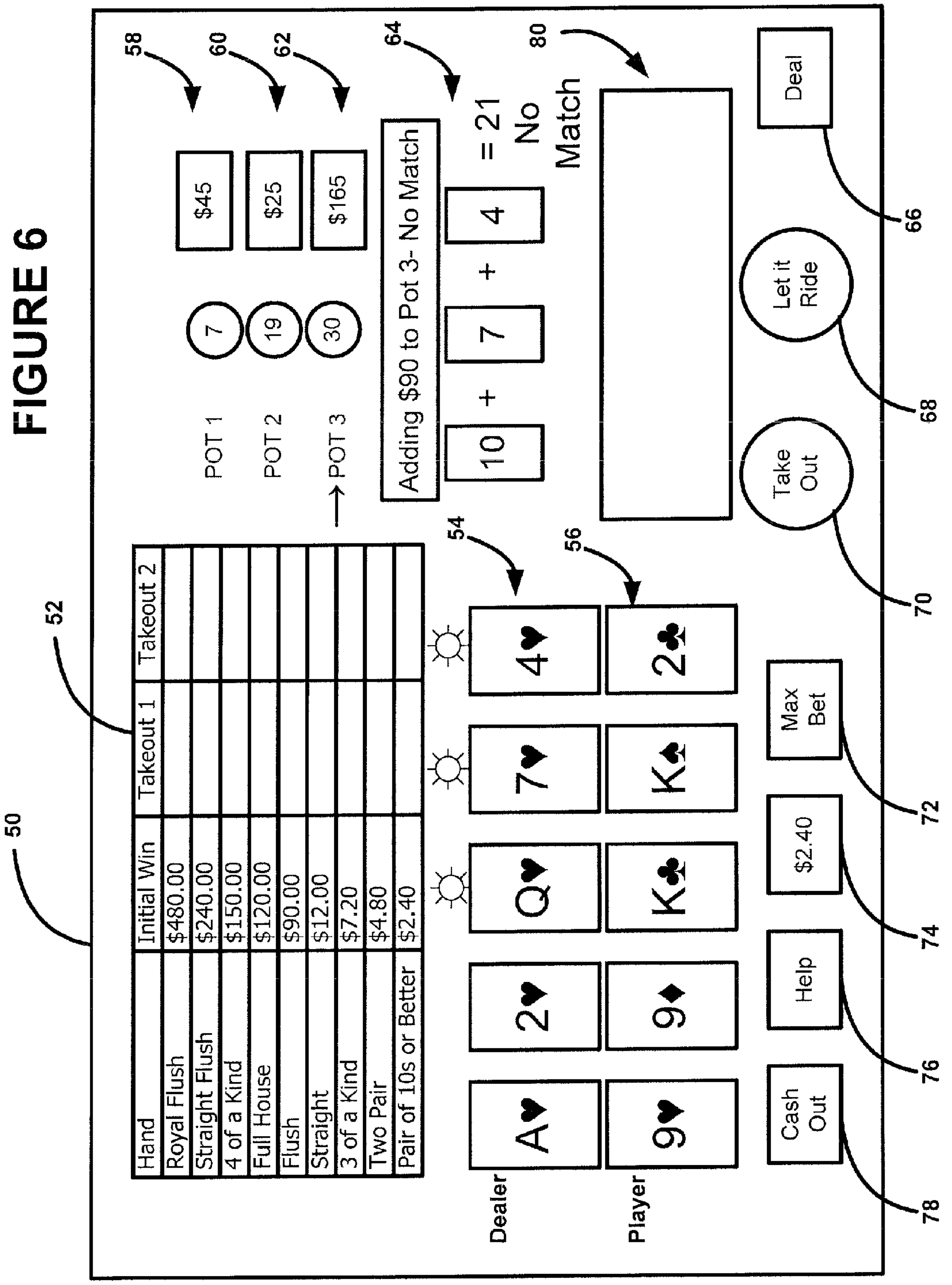

After the player's cards have been played, the dealer's five cards are displayed (FIG. 6). The last three of the dealer's cards are marked as the community cards ¤.

After the dealer's cards have been revealed (FIG. 6), the system adds the total of the three community cards (i.e. the dealer's cards). If the sum of the three community cards matches any of the numbers displayed in the accumulated pot areas the player qualifies to play one hand of five card draw poker against the dealer for the amount in the pot.

As described above, each pot accumulates whenever the dealer has a winning hand based on the five cards displayed during game play.

The player's wager determines the amount awarded to the active pot as well as the rank of win that occurs in the dealer's hand.

Importantly, the player and dealer are separate hands that do not play against each other during the main game. Rather, the player is trying to create the best winning hand based on the pay table after the last community card is dealt and as calculated based on the current wager. As shown in FIG. 5, the player has a 2 pair which entitles them to a payout of $4.80.

Figure 7:
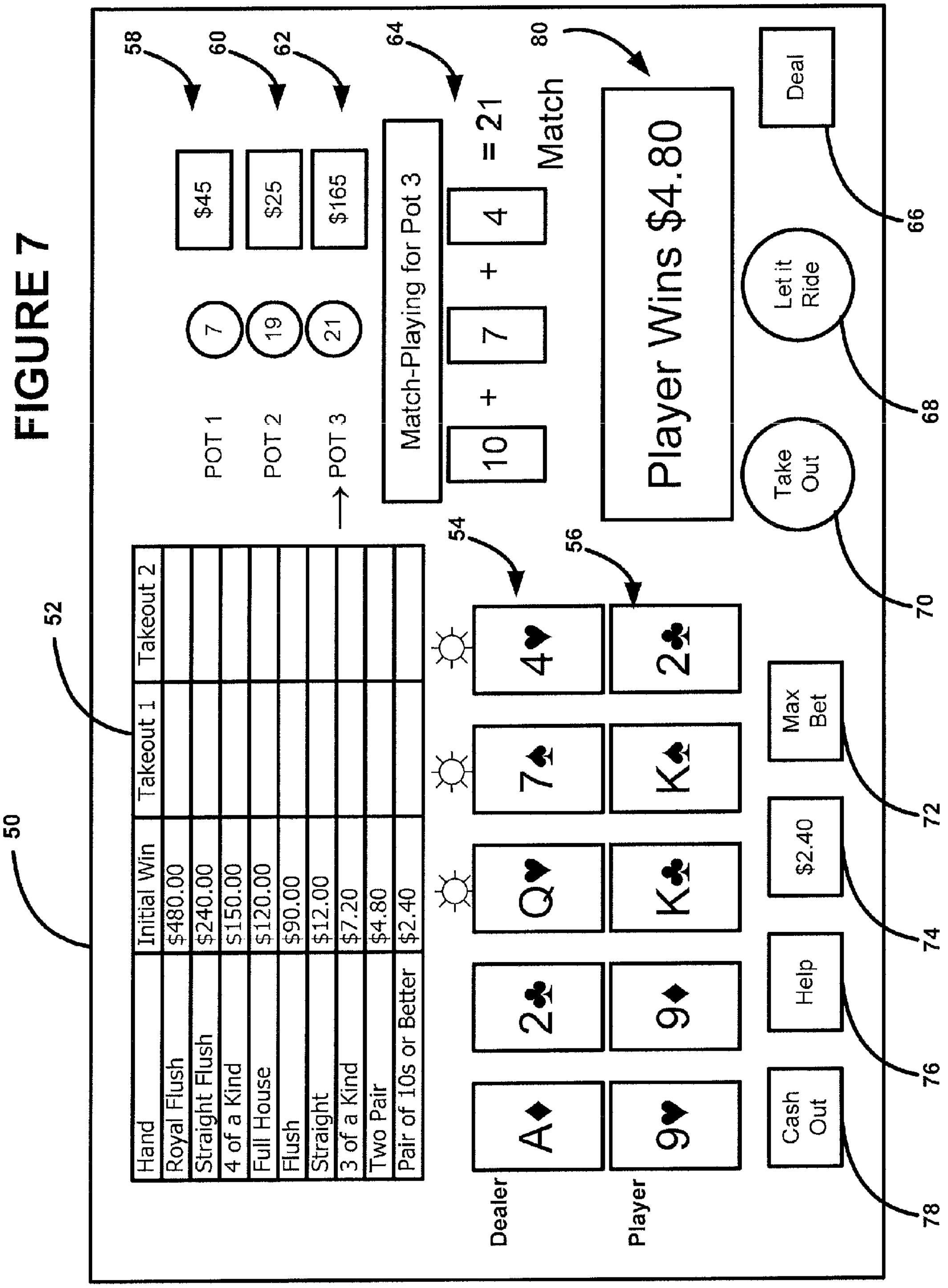
Figure 8:
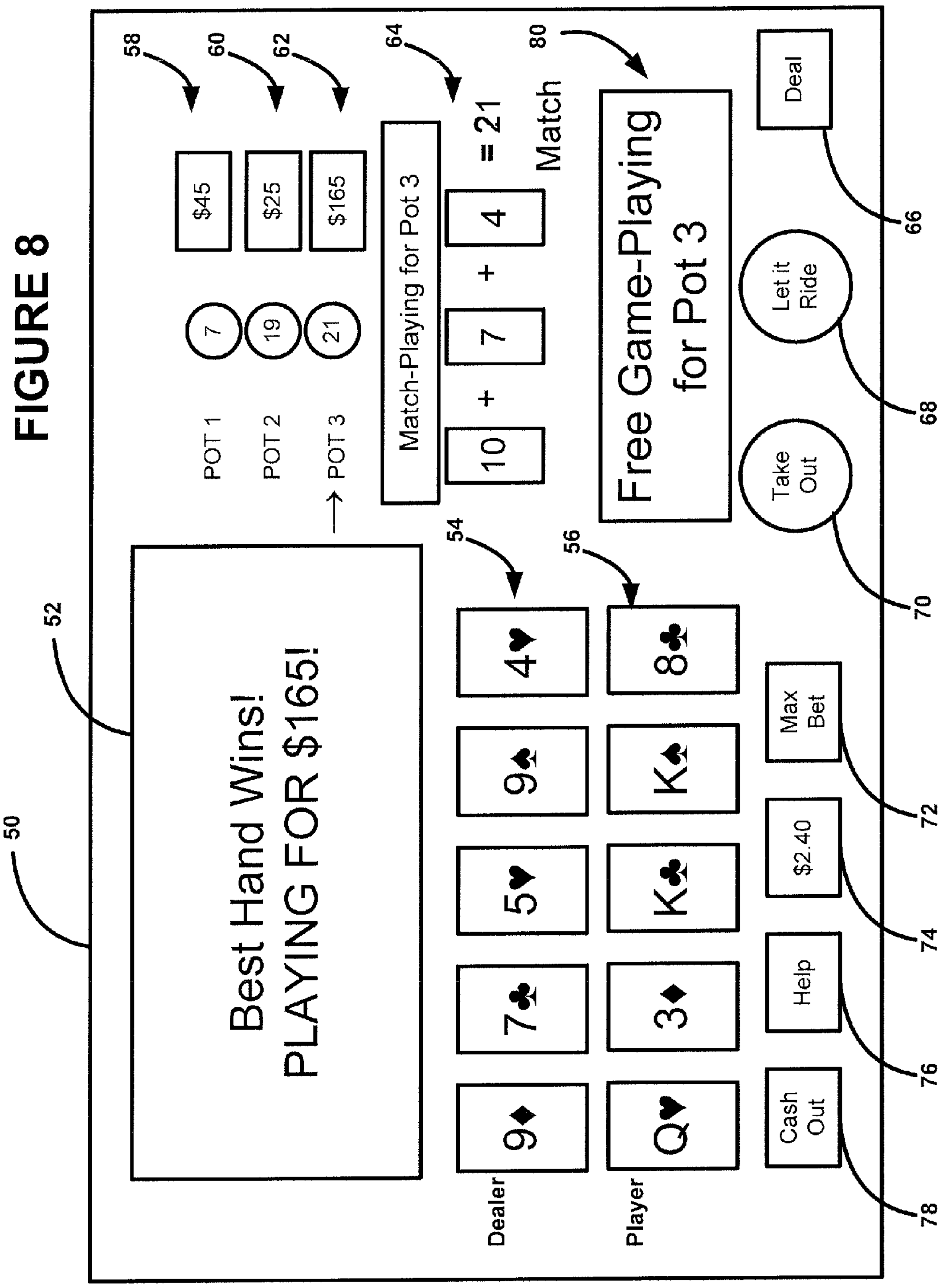

As shown in FIG. 6, subsequent to the result in FIG. 5, the dealer's cards are revealed. In this case, the dealer had a flush which would beat the player's 2 pair and would qualify for a $90 payout. Thus, $90 would be added to pot 3 (the highlighted pot). Thus, the dealer is simply trying to create the best pay table hand in which to add the amount to the active pool in the event that the dealer's hand is better than the player's hand. As shown in FIG. 6, the total of the last 3 of the dealer's cards is 21 (ref 64) which does not equal 30, the random number value displayed in the active pot 3 (ref 62), thus, not entitling the player to enter a showdown round. As shown in FIG. 7, the dealer's hand is shown as simply a high card but the random number value displayed in the active pot 3 (ref 62) in this round of play was 21, thus a showdown round is triggered. As shown in FIG. 8, the showdown round is a best hand between the dealer and player for the amount in highlighted pot 3. In this case, the player's hand of a pair of Kings beats the dealer's pair of 9's and thus, the player would win the $165 in showdown pot 3.

In each case, the paytable will be calculated to provide an overall house advantage.

C-Three Card Poker

In another embodiment, as shown in FIGS. 9-14, a variation of three card poker is described. In this game, the player can qualify for both a pay table win if they beat the dealer's hand or qualify and play for one of the three accumulated pots whenever the sum of the three Dealers cards match one of the randomly drawn showdown pot numbers (6 to 33) as described above.

Figure 9:
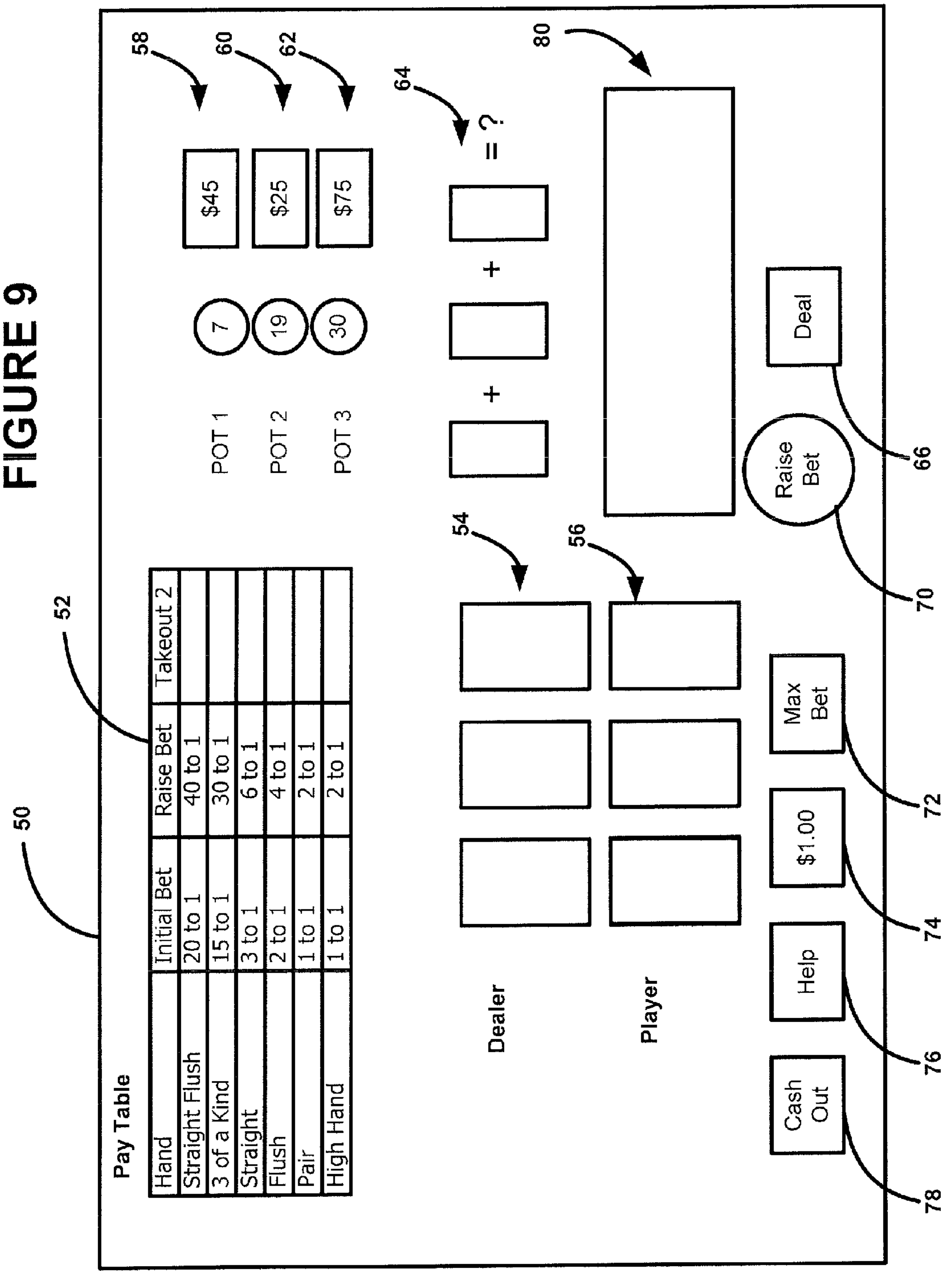
FIGS. 9-14 are representative displays of a game and game process in accordance with a "3-card Poker" embodiment of the invention.
Figure 10:
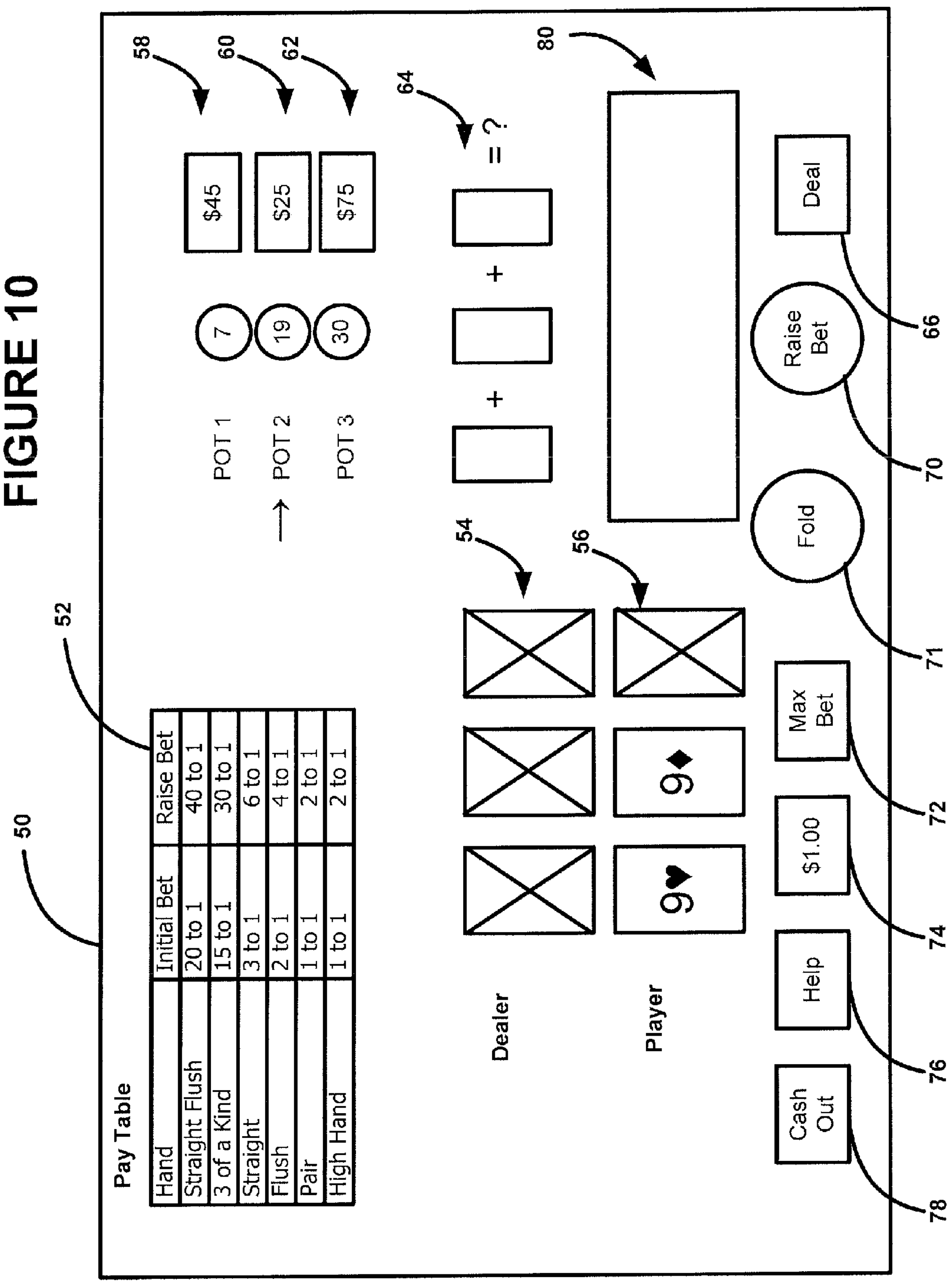

Play proceeds as follows:

- The player can make an initial wager of $0.20 to $1.20. As shown in FIG. 9, the initial bet is $1 (ref 74).
- Once an initial wager is made, three cards are dealt to the player with only the first two cards revealed (FIG. 10) and the third card remains face down.
- The player must then decide if they want to continue playing or fold their cards forfeiting their initial bet.
- If the fold button 71 is pressed, the game ends.
- Alternatively, if the deal button 66 is pressed, the game continues.
- In one embodiment, pressing the Raise Bet button 70 doubles the player's initial wager (in this case to $2) and reveals the player's third card (FIG. 11) and the system then reveals the Dealer's three cards. In another embodiment, the player can simply proceed with the same bet.
- The system then evaluates:
  - Who has the best hand (Player or Dealer)?
  - Has the player qualified to play for one of the accumulated pots?

Figure 11:
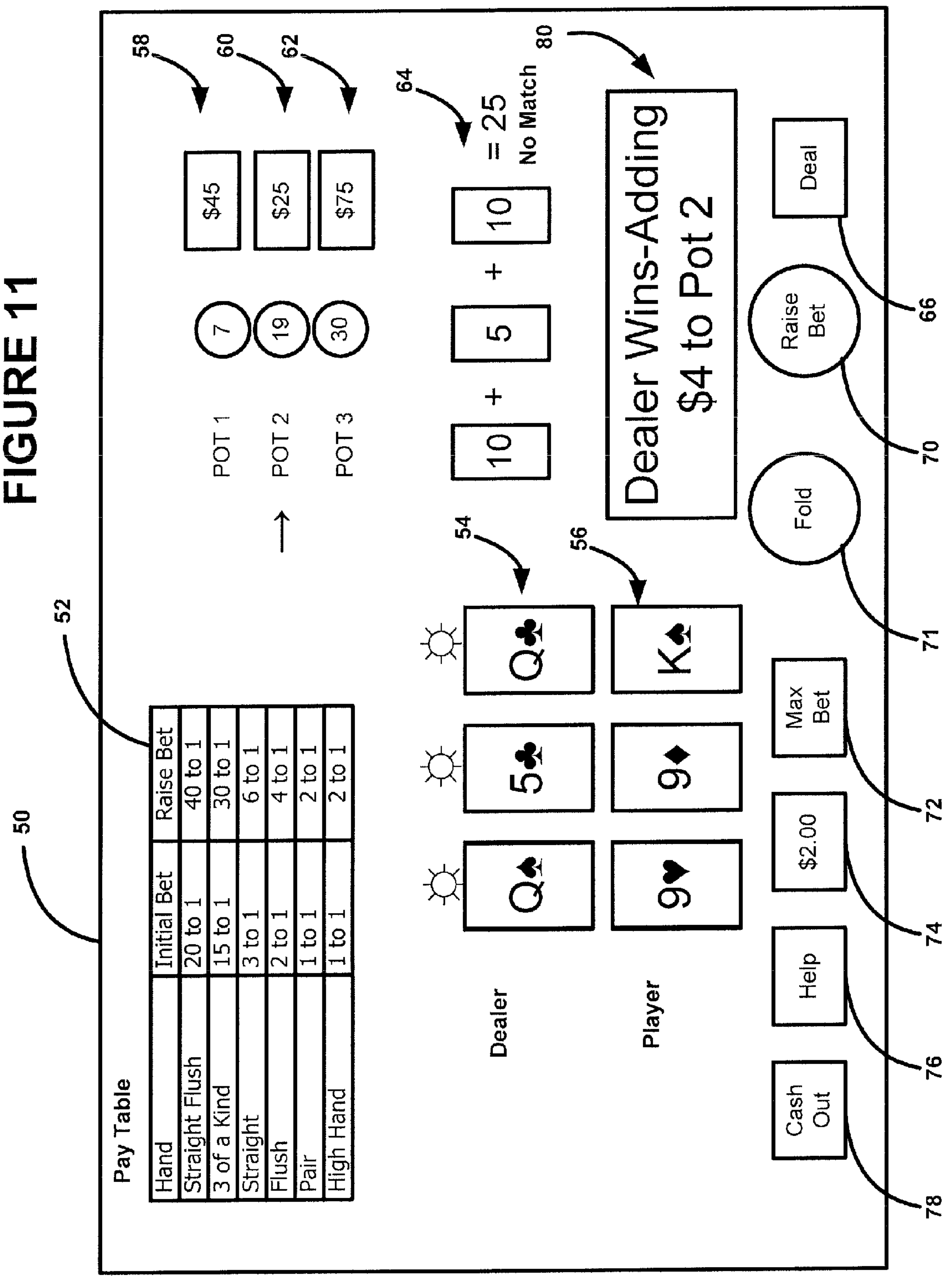

As shown in FIG. 11, the dealer wins with a pair of Queens and according to the pay table $4 (2 to 1 on a $2 bet) is added to highlighted pot 2.

Figure 12:
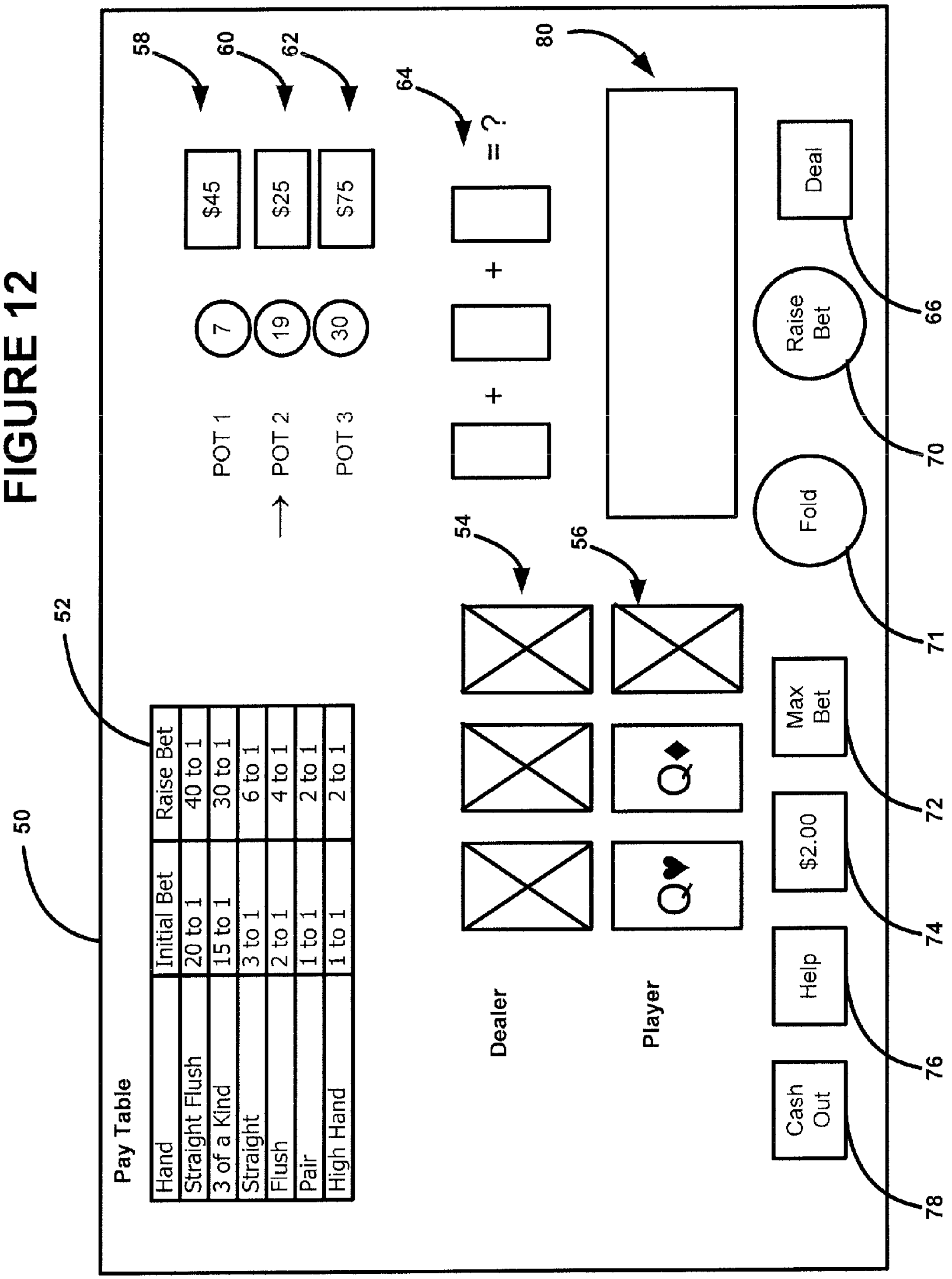
Figure 13:
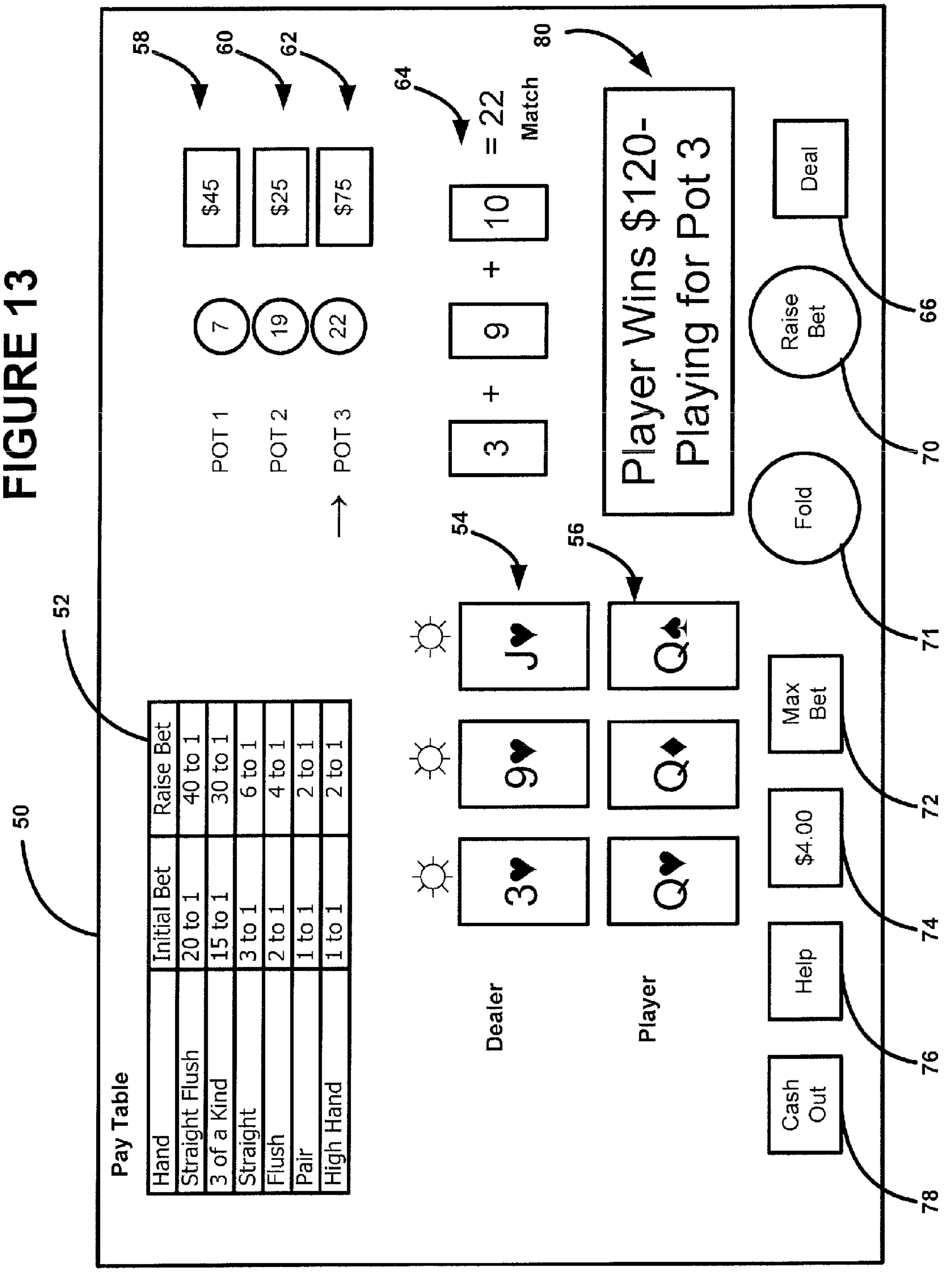
Figure 14:
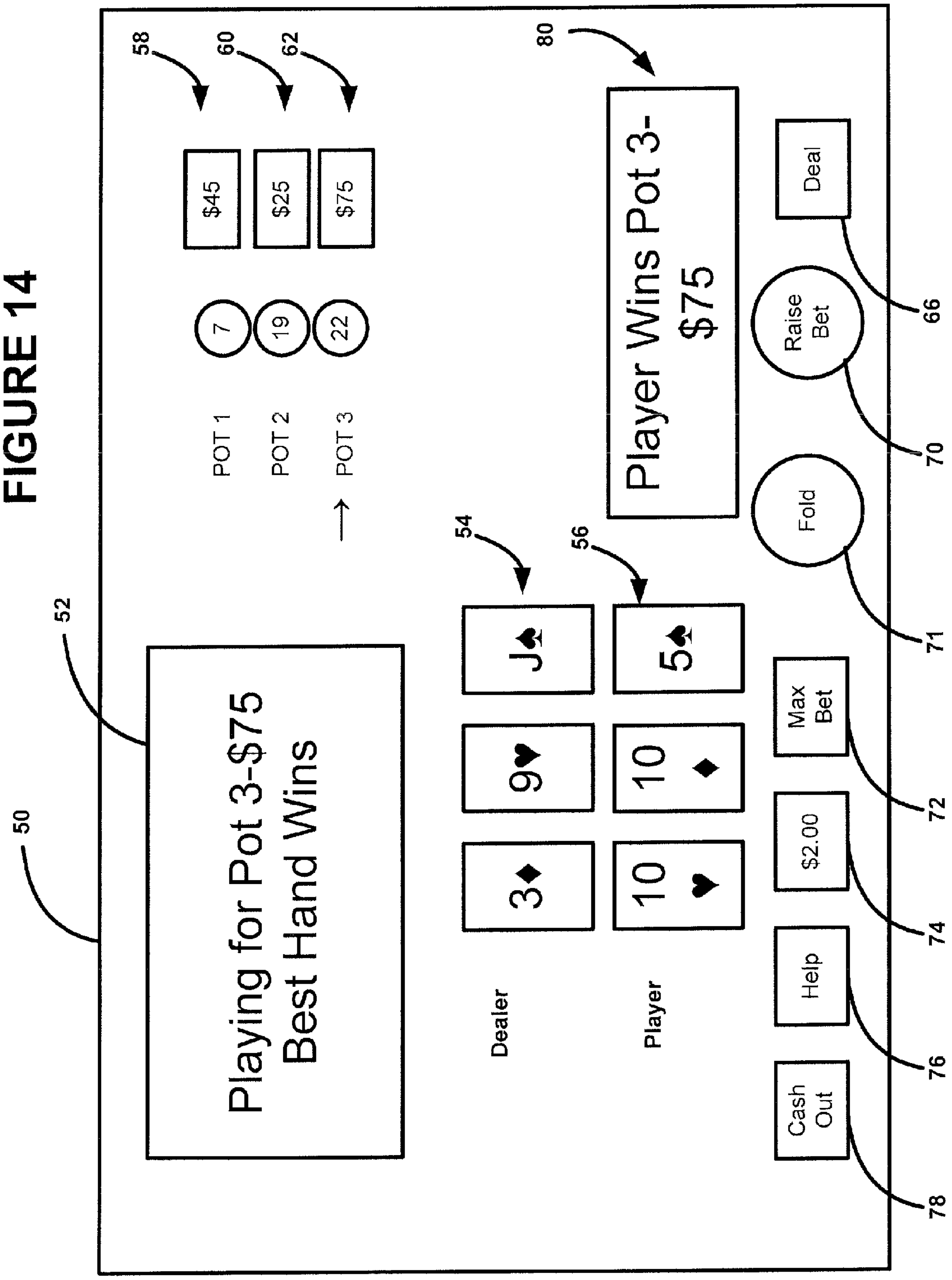

Alternatively, as shown in FIGS. 12 and 13, if the player has the best hand (in this case 3 Queens vs. a flush), the player wins $120 (based on a $4 bet at 30 to 1 from the pay table). In this case, the 3 cards of the dealer also total 22 and thus the player is entitled to play for highlighted pot 3 ($75) based on the random number display at 62. Again, in this case as shown in FIG. 14, 3 cards are dealt to the player and dealer. The player beats the dealer (pair of 10's vs. Jack high) and the amount highlighted in the highlighted pot 3 ($75) is awarded to the player and pot 3 is reset to zero. Alternatively, if the dealer had beaten the player, pot 3 would be cleared (to the credit of the house) and reset to zero. In the event of a tie hand the pot is neither awarded or is it cleared.

D-Omaha Poker

Another embodiment is described in FIGS. 15-21. This game is a variation of Omaha poker that allows the player to qualify for both a pay table win if they beat the game's pay table and qualify and play for one of the three accumulated pots whenever the sum of the last three community cards match one of the randomly drawn pot numbers (6 to 33).

In this embodiment, the player has 4 cards 56, the dealer has 4 cards 54 and five community cards 57 are displayed.

Figure 15:
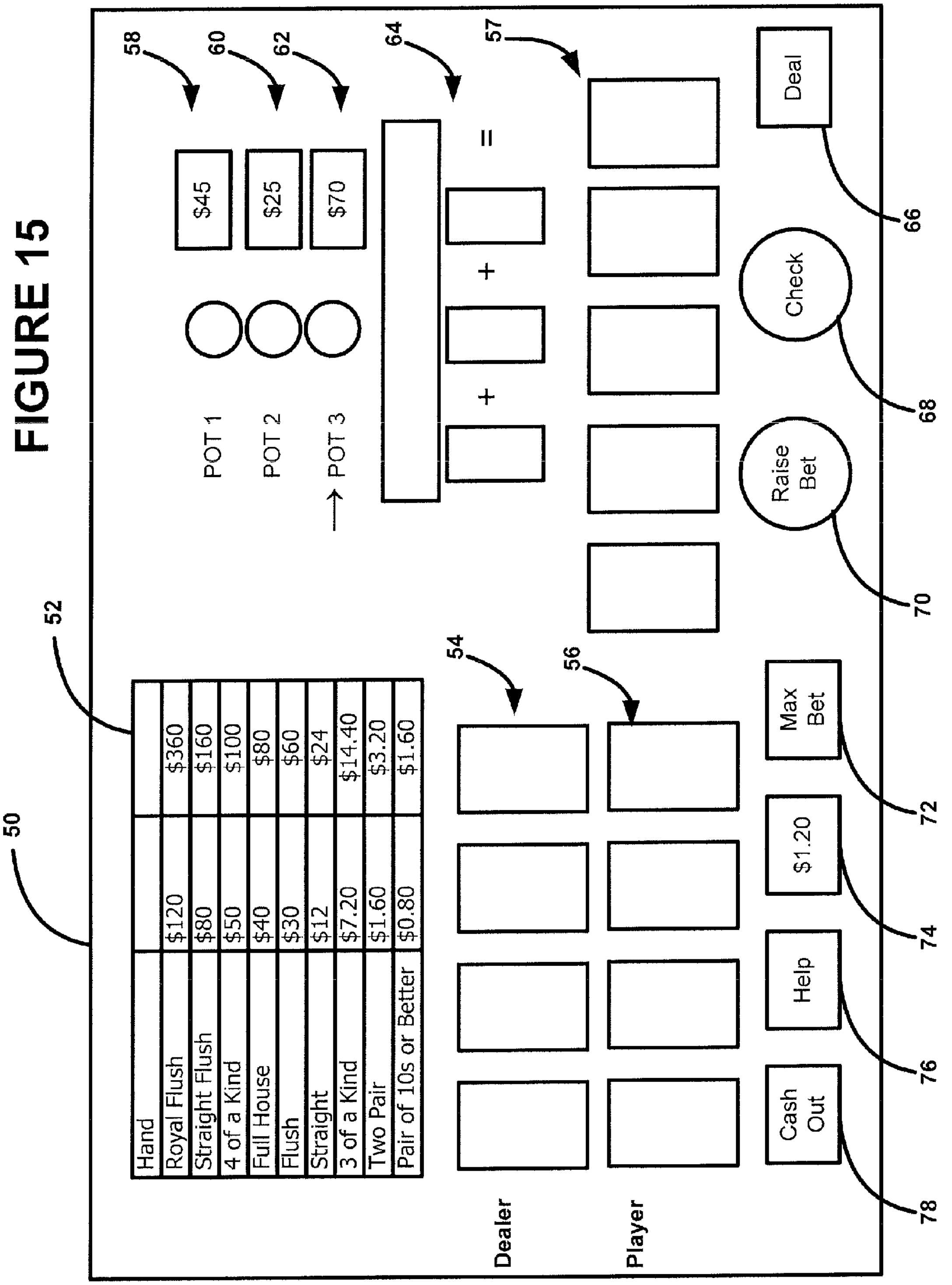
FIGS. 15-21 are representative displays of a game and game process in accordance with a "Omaha Poker" embodiment of the invention.
Figure 16:
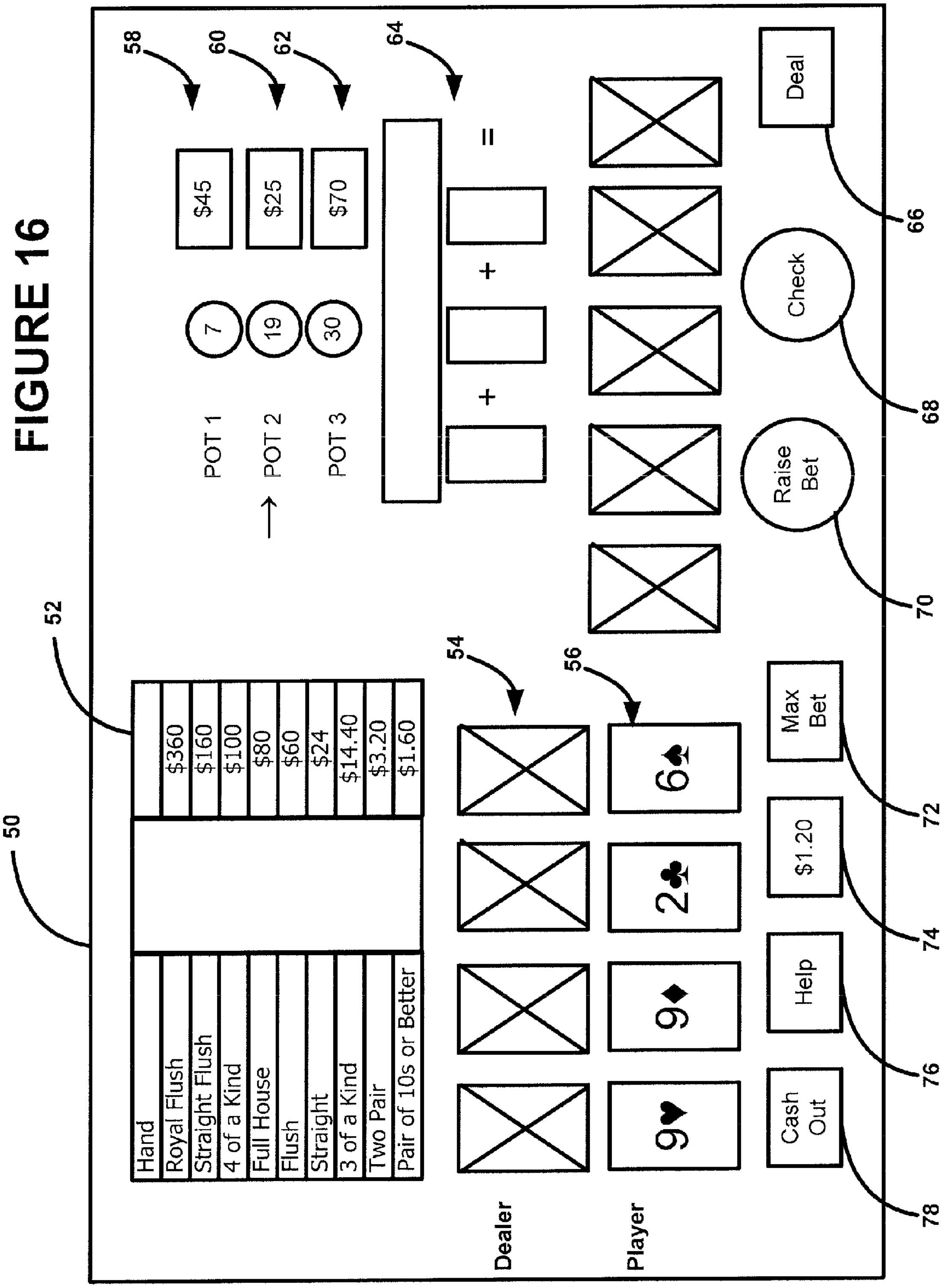
Figure 17:
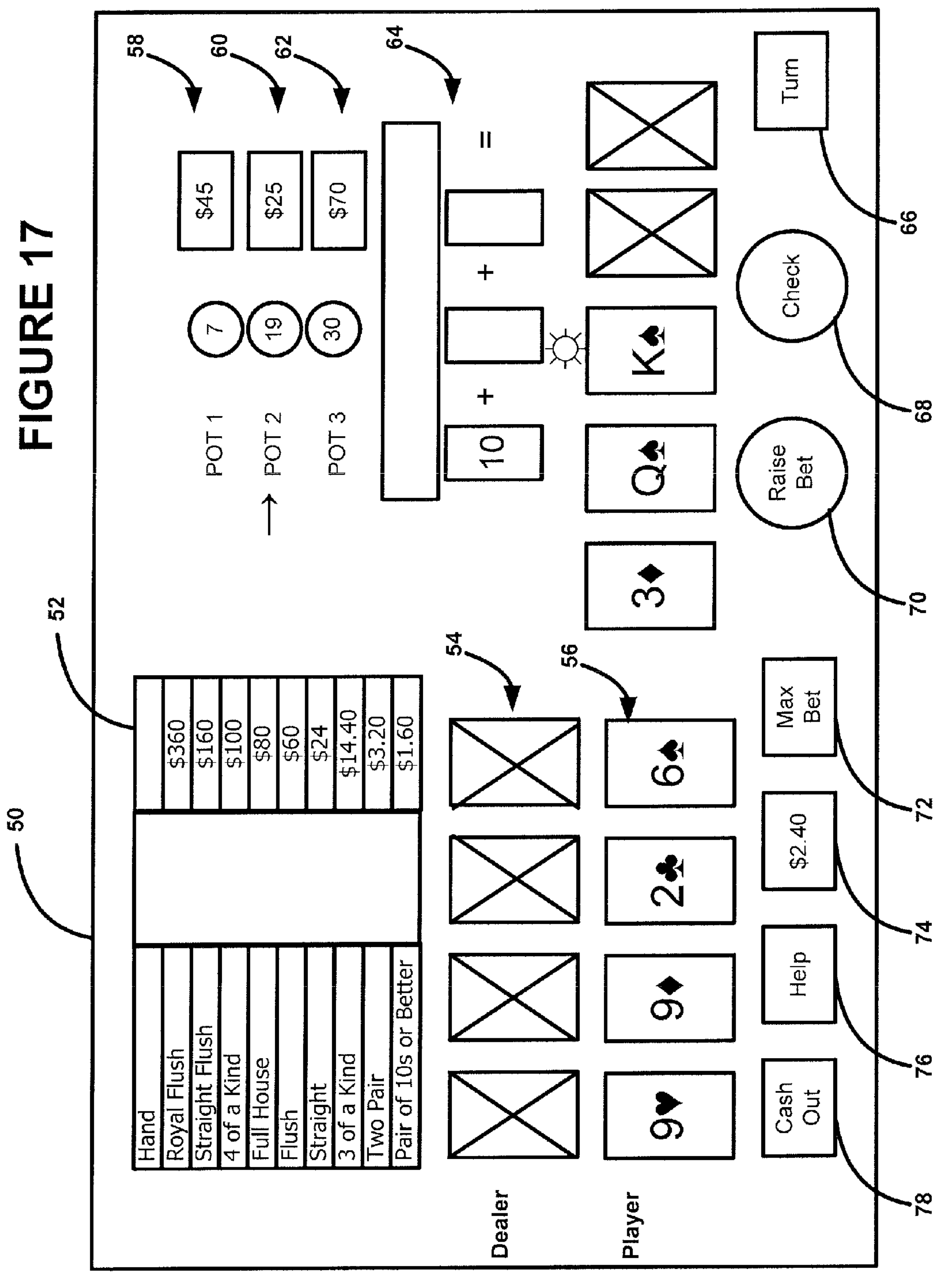
Figure 18:
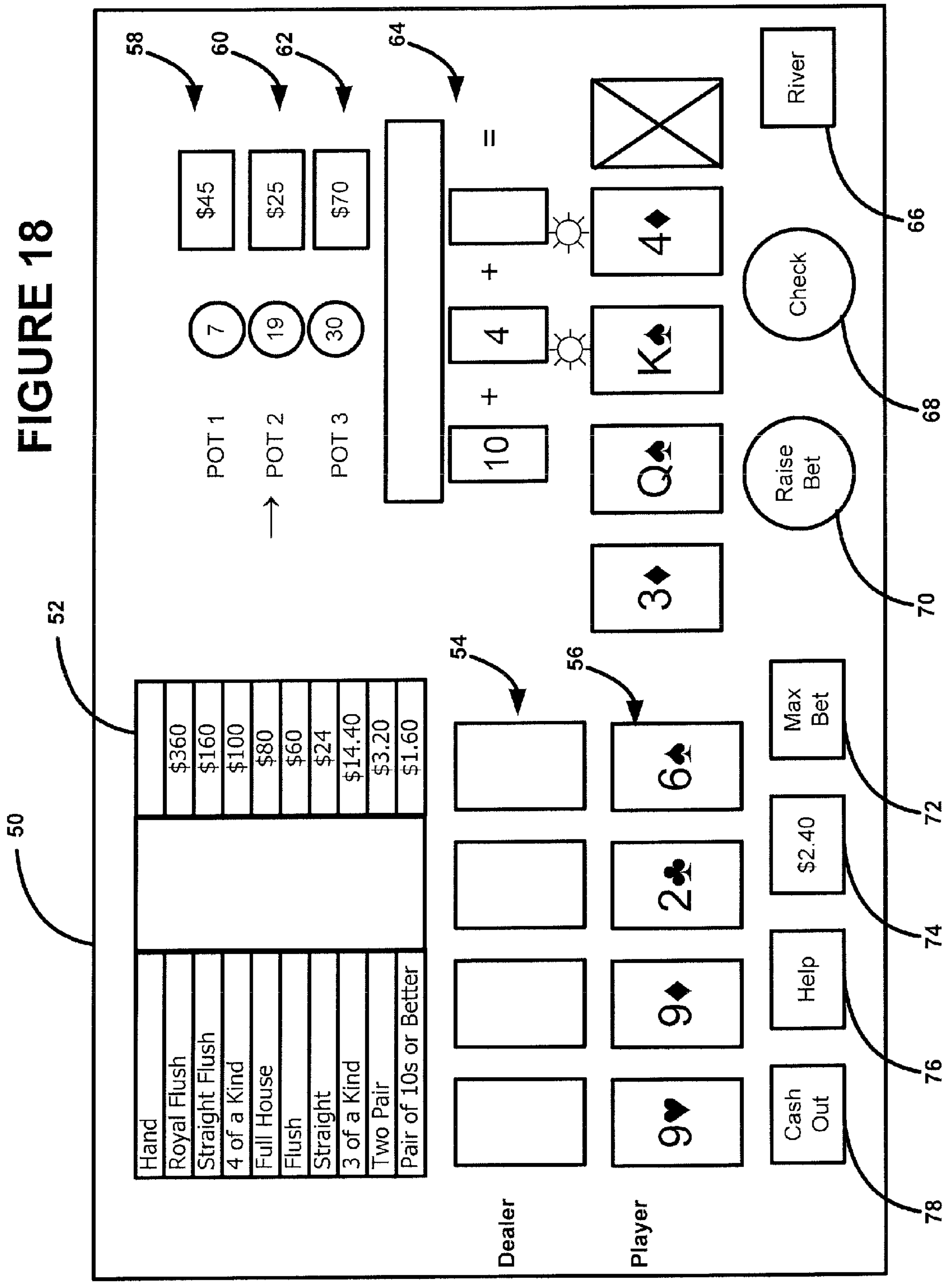
Figure 19:
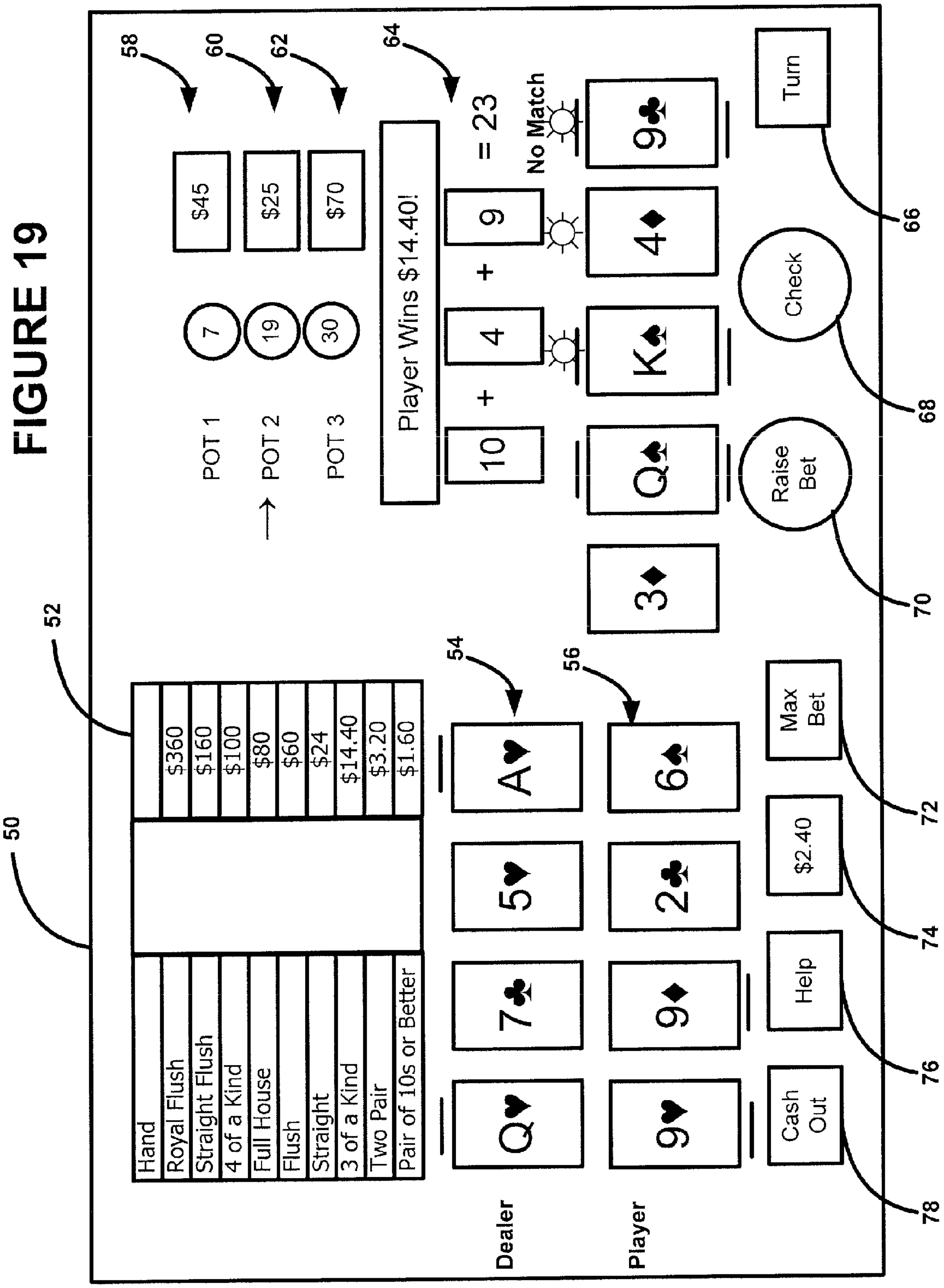
Figure 20:
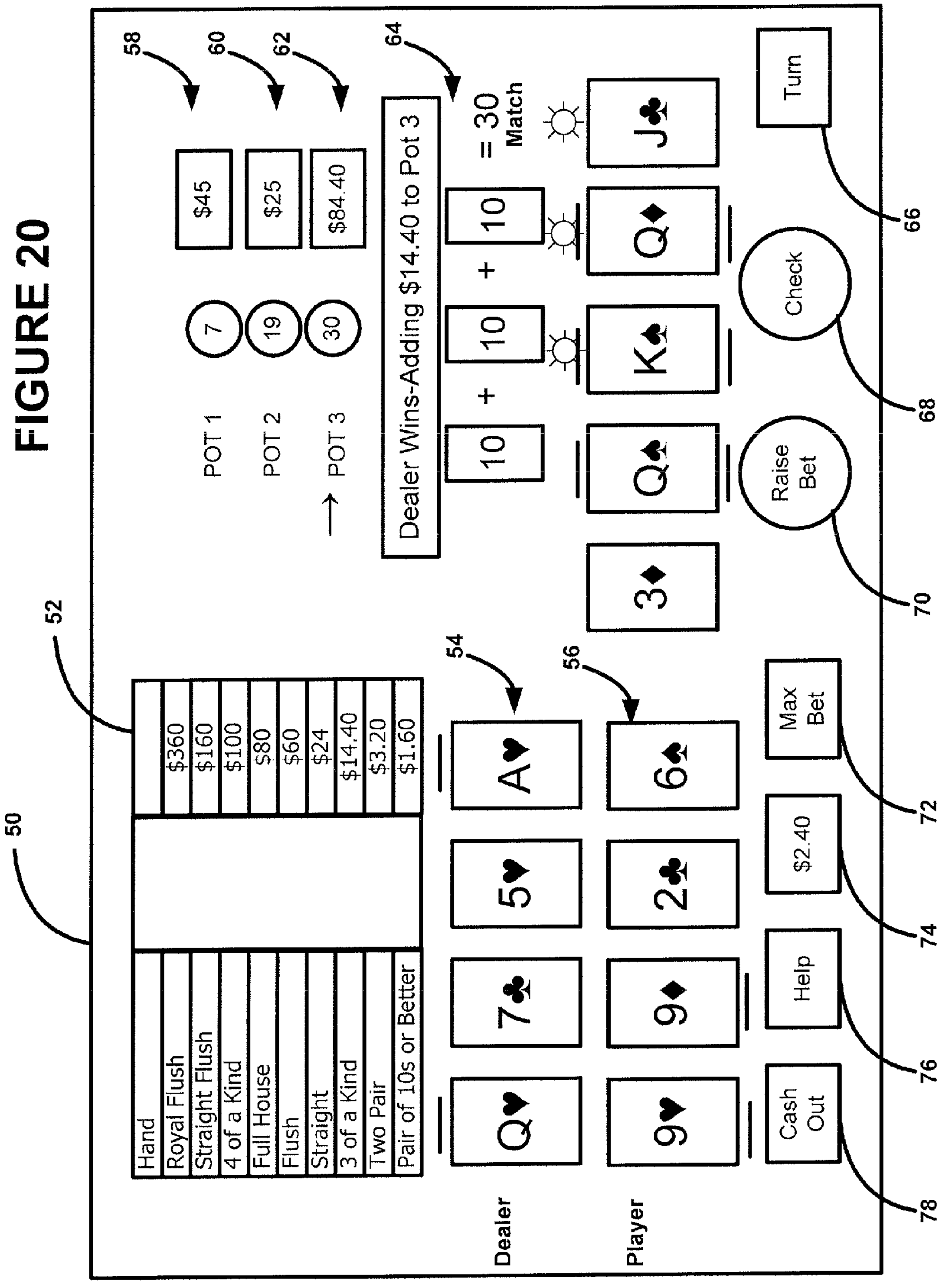
Figure 21:
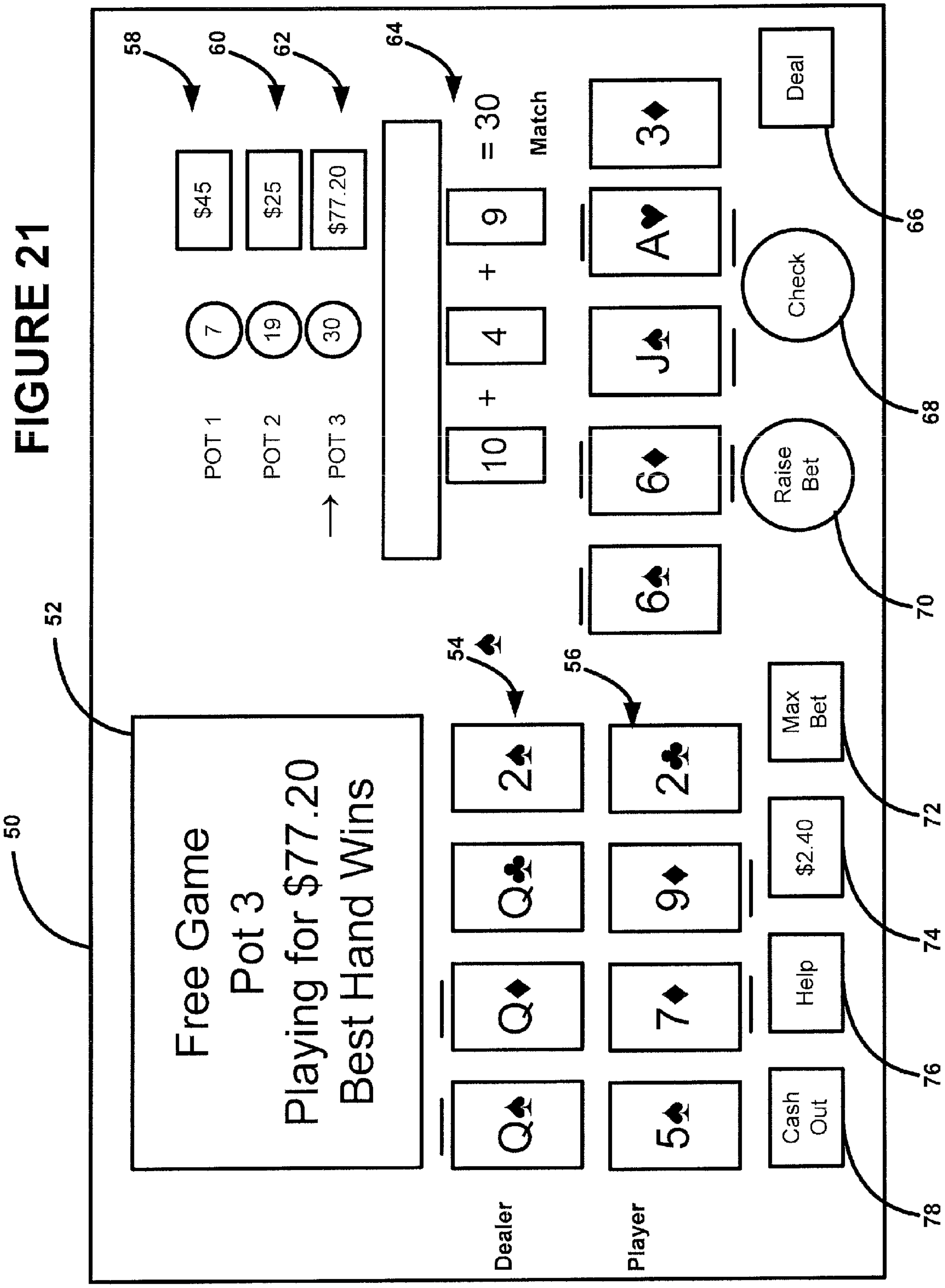

Play proceeds as follows:

- The player makes an initial wager ranging from $0.20 to $1.20. As shown in FIG. 15, the initial wager is $1.20. Once an initial wager is made four hole cards are dealt to the player (face up) and to the dealer (face down) (FIG. 16) and the five community cards (face down). At this time, the system also randomly generates three numbers from 6 to 33 and assigns one to each of the accumulating pot areas. In this case the numbers are 17, 19 and 30 respectively for the three showdown pots.
- The player now has a choice whether to raise their bet based on their hole cards or check (i.e. continue game play with current bet). If the bet is raised, the pay table amounts are updated.
- Pressing either the Raise bet or Check button continues game play and reveals the first three community cards (Flop) (FIG. 17).
- The player now presses the Show Turn and Show River buttons to reveal the last two community cards (Turn and River cards) (FIGS. 18 and 19).
- Once the river card has been revealed the system then reveals the Dealers four hole cards (FIG. 19).
- The best hand is then determined between the Player and the Dealer by combining two of the four hole cards in the player's and dealer's hole card area and three of the five community cards in the community area. In this case, the player has 3 9's to the dealer's pair of Queens, and based on the paytable wins $14.40.
- The system also checks to see if the sum of the last three community cards matches one of the three numbers displayed in the accumulating pot areas. In FIG. 19, this is shown as totaling 23 which is not a match to highlighted pot 3.
- If the dealer has the best hand the highlighted pay table amount is awarded to the active pot (1, 2 or 3) as shown in FIG. 20 where the dealer has 3 Queens to the player's two pair. As a result, $14.40 is added to pot 3 (ref 62).
- As shown in FIG. 20, the last three community cards total 30 which is a match for the random number displayed for highlighted pot 3. As a result, the player can play a showdown round for pot 3 (FIG. 21).
- In this embodiment, all four hole cards for the player and dealer and all five community cards are dealt and the best hand determined based on 3 community cards and 2 hole cards. In this case, the dealer wins (2 pair v. pair of 6's) and the $77.20 in showdown pot 3 is cleared for the benefit of the house.

E-Blackjack

Another embodiment is described in FIGS. 22-33. This embodiment is a variation of Blackjack that allows the player to qualify for a win if they beat the dealer in a blackjack game and qualify for a showdown pot. For the purposes of illustration and as described above, a player may qualify for a showdown whenever the sum of three pre-determined cards on the table match a randomly drawn pot numbers (6 to 33).

Figure 22:
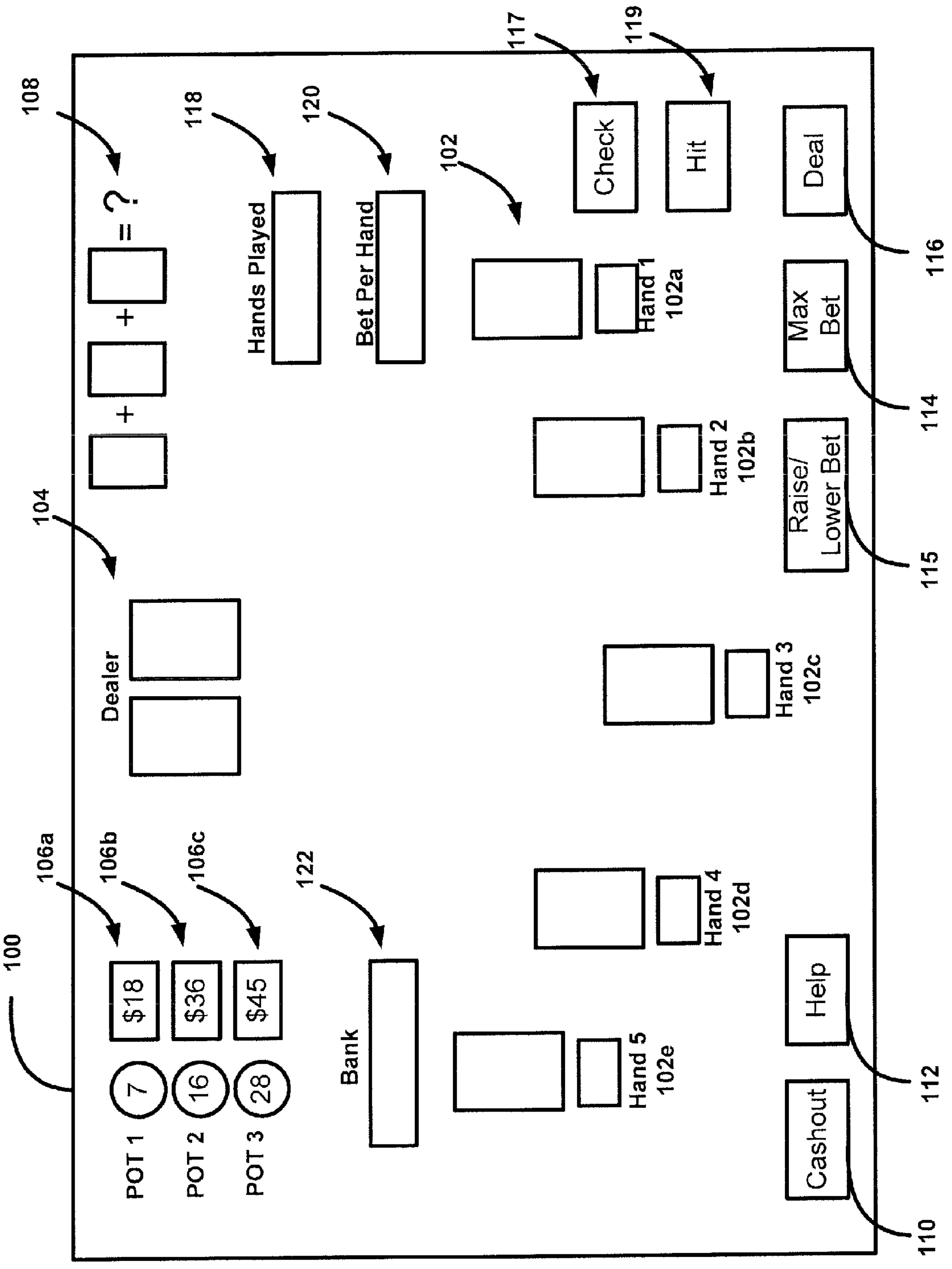
FIGS. 22-33*a* are representative displays of a game and game process in accordance with a "Blackjack" embodiment of the invention.

FIGS. 22-33 show an example of a game interface and representative examples of game play. As shown in FIG. 22, a representative blackjack game display 100 is described. The display includes player hand displays 102*a*, 102*b*, 102*c*, 102*d* and 102*e* for a representative table showing player cards allowing a player to play 1 to 5 hands simultaneously. A dealer display 104 shows the dealer cards. A showdown pot display 106 includes three showdown pots 106*a*, 106*b*, 106*c* each displaying a random number. The random number must be matched to trigger a showdown round as explained below. A showdown pot qualification display 108 shows those numbers based on the regular game that are summed to determine if a showdown round is triggered. The display further includes a "Cashout" button 110, a "Help" button "112", a "Max Bet" button 114, a "Raise Bet" button 115, a "Check" button 117, a "Hit" button 119 and a "Deal" button 116. The display may further include a "Hands Played" display 118 showing the number of hands being played, a "Bet Per Hand" display 120 and a "Bank" display 122 showing the player's credits. During play, each screen button becomes active based on the stage of game play.

Generally, regular game play proceeds as follows in the context of an embodiment in which a player can play up to five different and independent hands.

Figure 23:
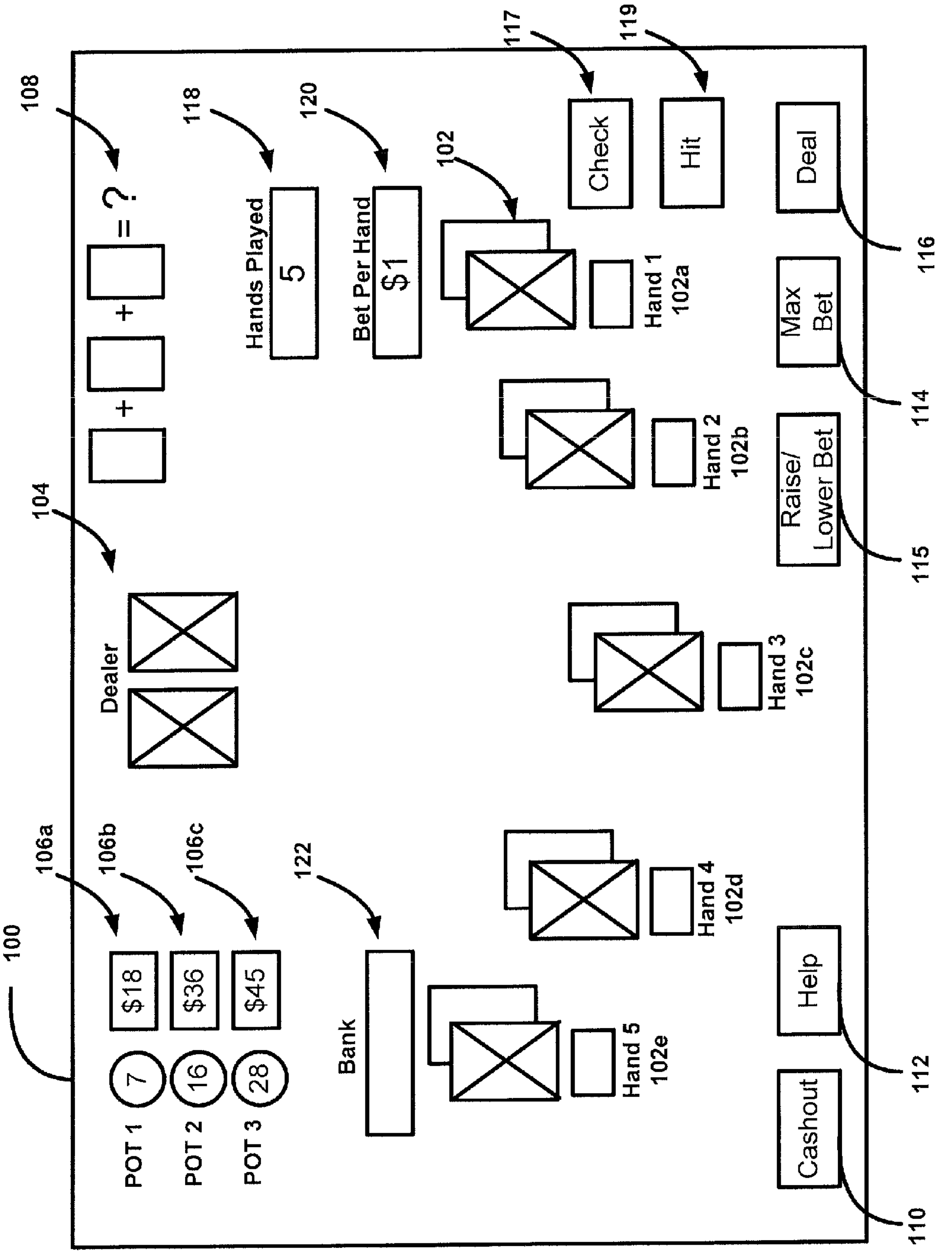

To begin, the player makes an initial wager on one to five locations on the Blackjack table. Once an initial wager is made two cards are dealt face down to all active play areas as well as the dealer's location (FIG. 23). The player first selects the number of hand(s) they wish to play and then sets an initial wager for each of the hand (s). In this example the player has selected all five hands to play with an initial wager of $1.00 for each hand. The player is then prompted to press the Deal button.

Figure 24:
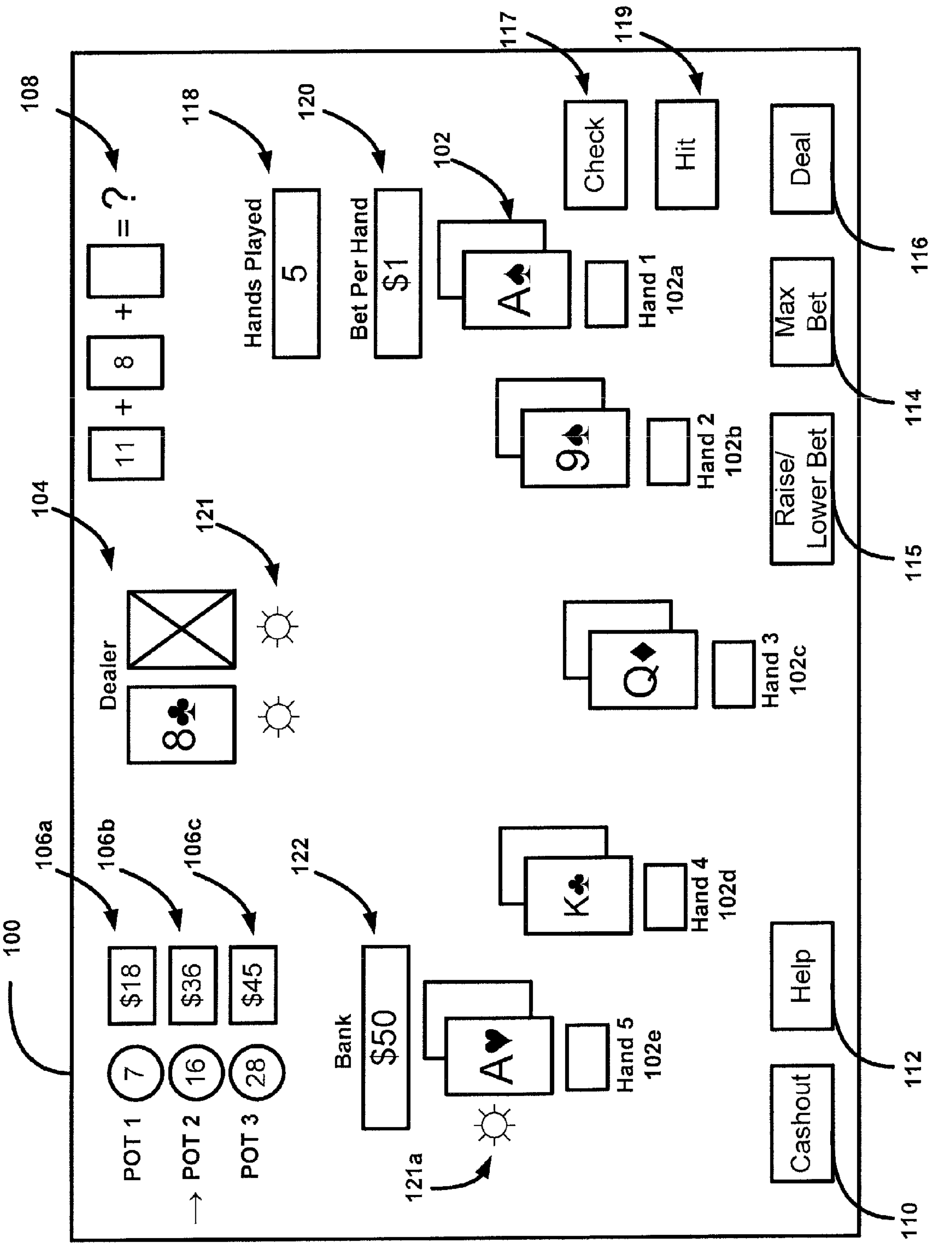
Figure 25:
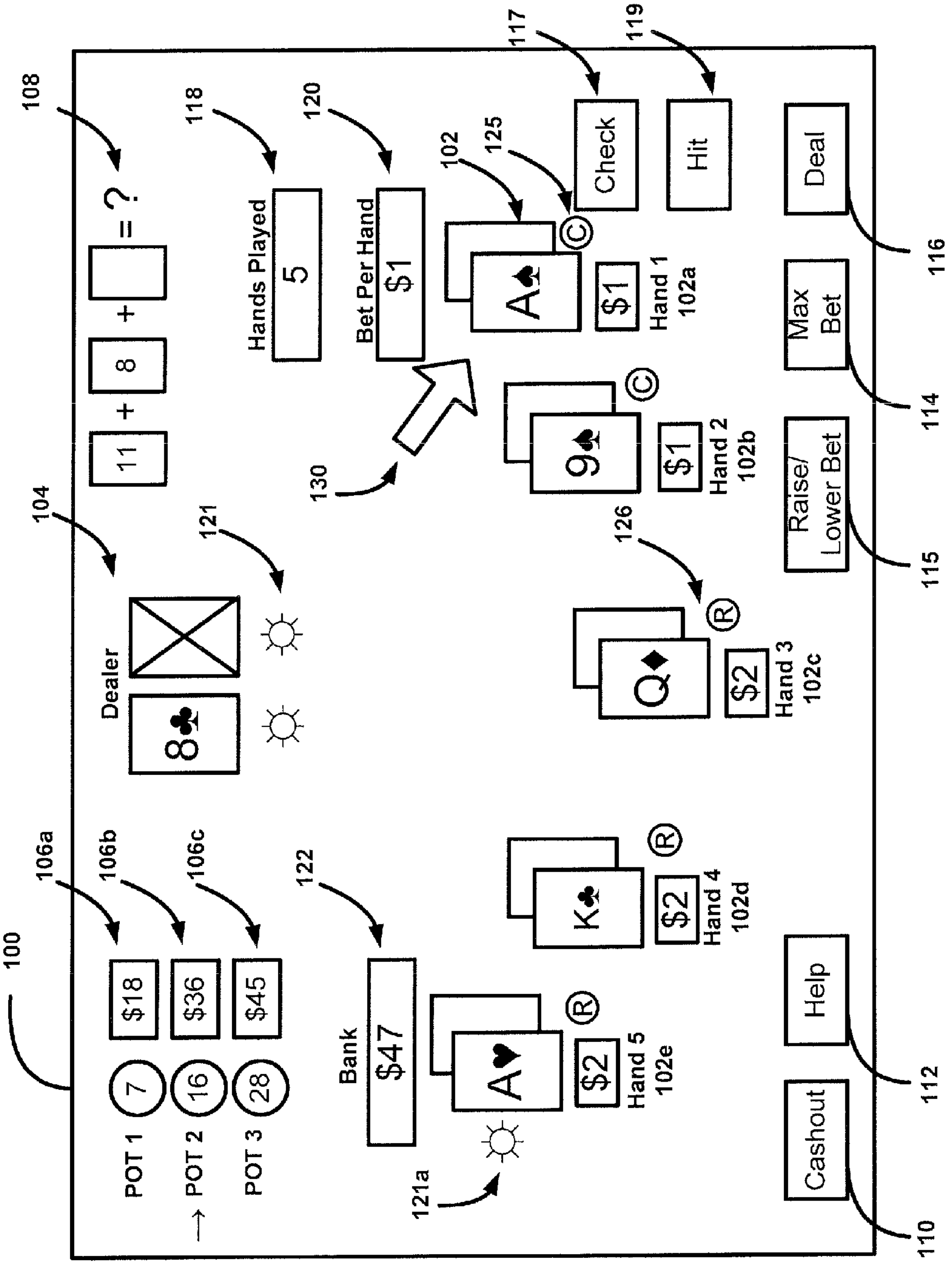
Figure 26:
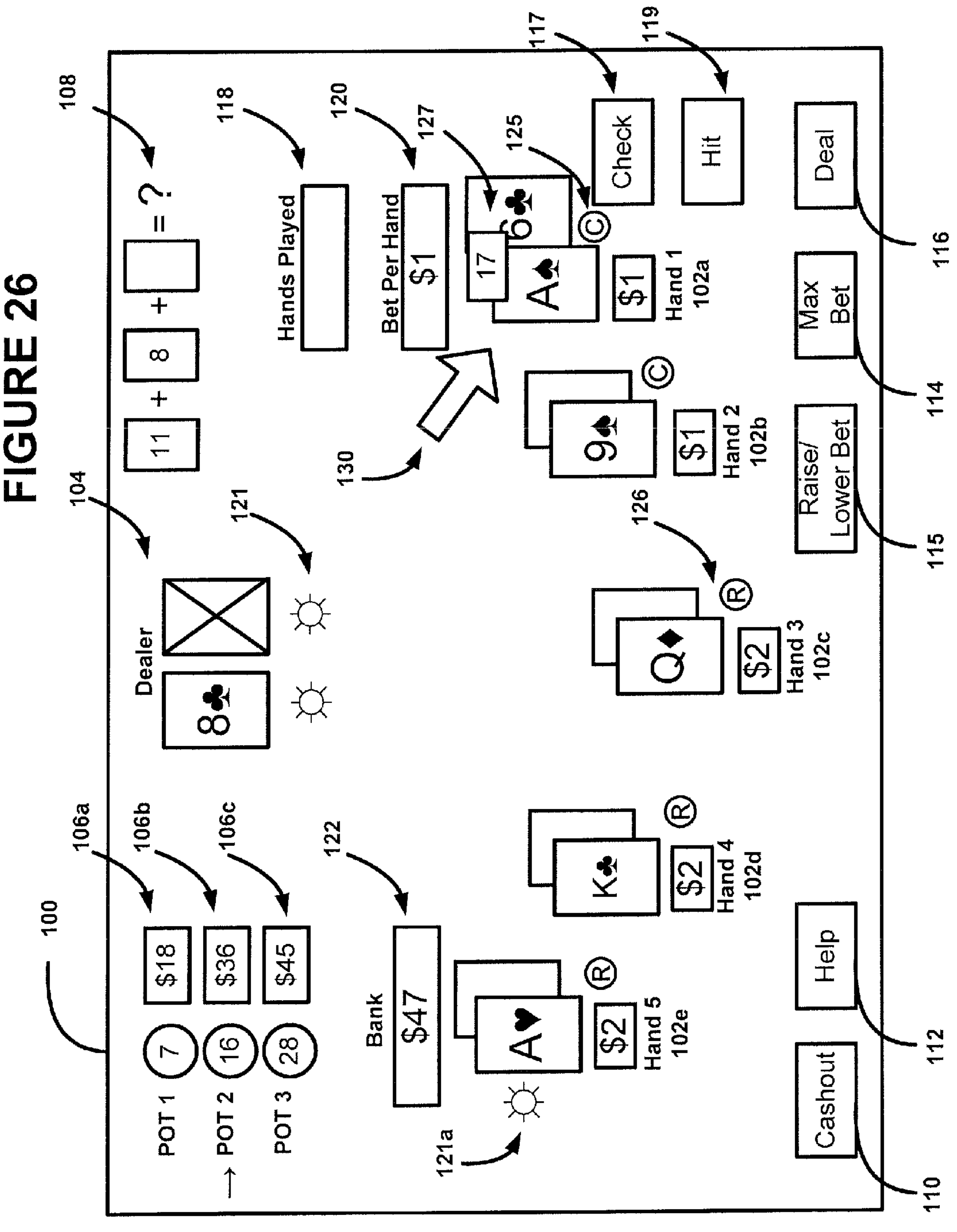

Pressing the Deal button initiates game play. The system deals one card (face up) to each of the areas on the table that contain a wager as well as the dealer's area (FIG. 24). The dealer's first card is flipped and revealed to the player.

The system randomly marks 121*a* one of the player's cards and randomly draws three numbers from 6 to 33 and places one in each pot area. The value of the player's marked card (Ace=11) and the dealer's first card (an 8) are placed in the showdown pot qualification display 108 (FIG. 24). The dealer's two cards that will be used in the showdown pot qualification display 108 may also be marked 121. An arrow on the table points to the current active pot. Each of the player hands beaten by the dealer will add their final wager to the active pot. Once the first sets of cards have been dealt, game play continues with the next stage of game play (Check or Raise).

The player decides whether they want to check or raise their bet on each of their wagered hands based on their exposed cards and the dealer exposed card. The player makes this decision successively for each of their hands (FIGS. 25-30). The active hand which allows player input is highlighted 130.

Beginning with the first active hand (FIG. 26), a second card is revealed. The player decides whether to press "Check" (no further cards) or press "Hit" to take another card. Pressing the "Check" button stops additional cards from being dealt to this hand and play moves on to the next active area (FIGS. 26, 27, 28, 29, 30). The total/status 127 for the hand is displayed. Pressing the "Hit" button 119 allows the player to receive an additional card for the current hand each time the button is pressed. Play continues until all the player hands have been played out. Each hand is marked with a © 125 (hand checked) or ® 126 (raise bet) symbol to indicate the status of the hand. Each time a raise bet is made the amount is deducted from the player's bank 122. Once all active hands have been Checked or Raised the next stage of game play begins (Hit or Stand).

The player has stopped at 17 on the first active hand (FIG. 26) and has marked the hand as checked. Once the check button is pressed, Blackjack occurs or the player busts the system automatically moves to the next active hand.

Figure 27:
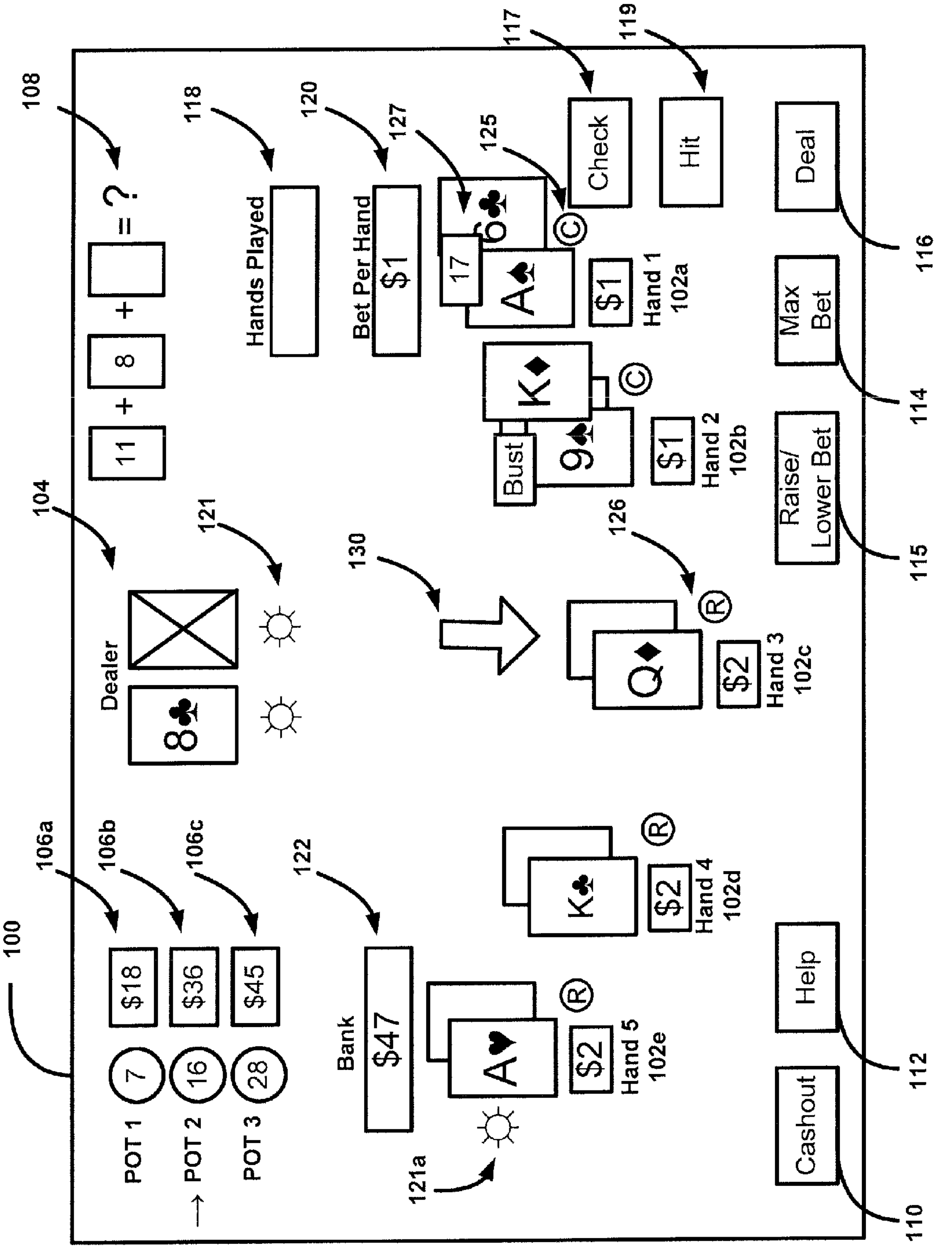

Game play on the second active hand ended with a bust, thus, the system automatically moves on to the next active hand (FIG. 27).

Figure 28:
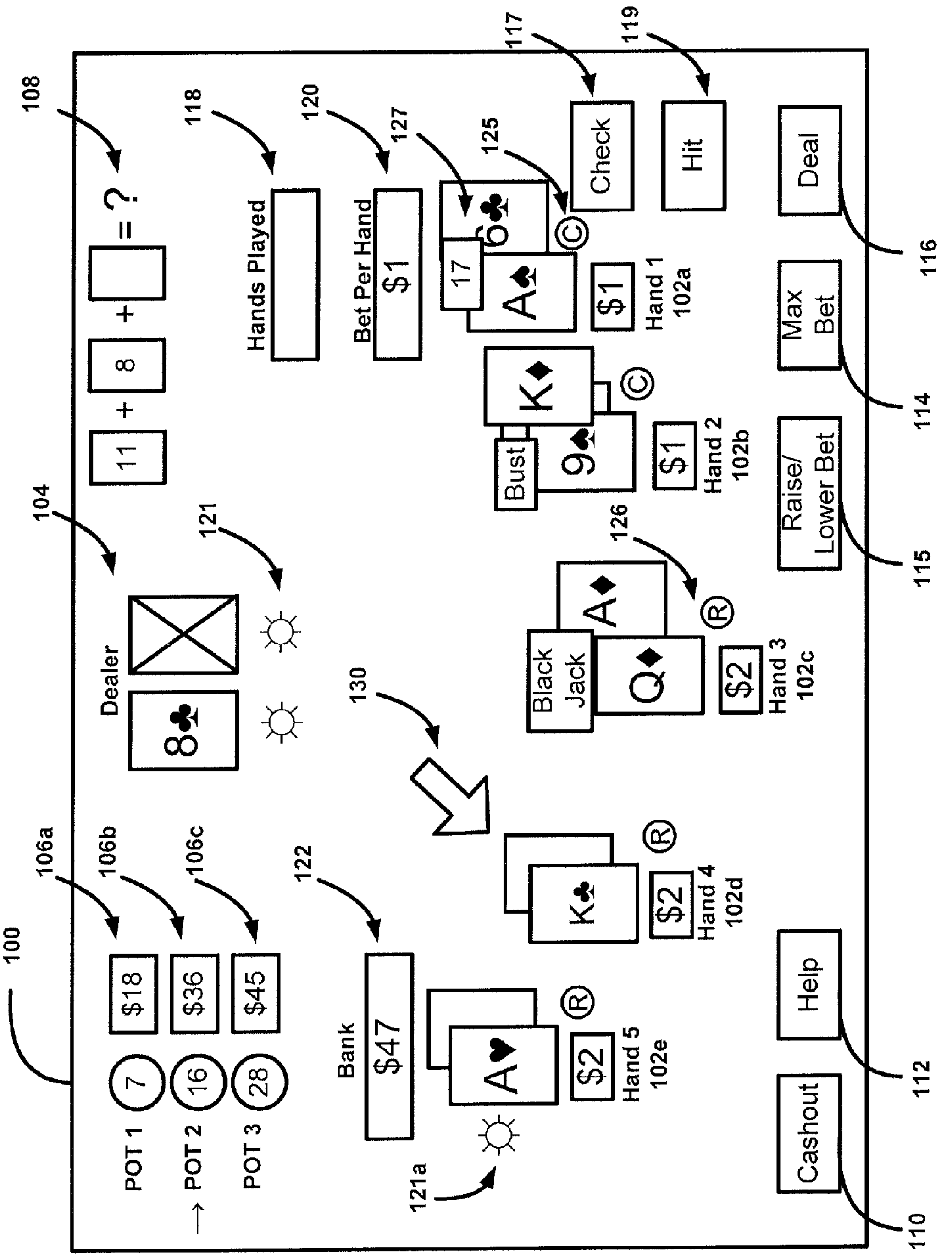

Game play on the third active hand ended with a Blackjack, thus, the system automatically moves on to the next active hand (FIG. 28).

Figure 29:
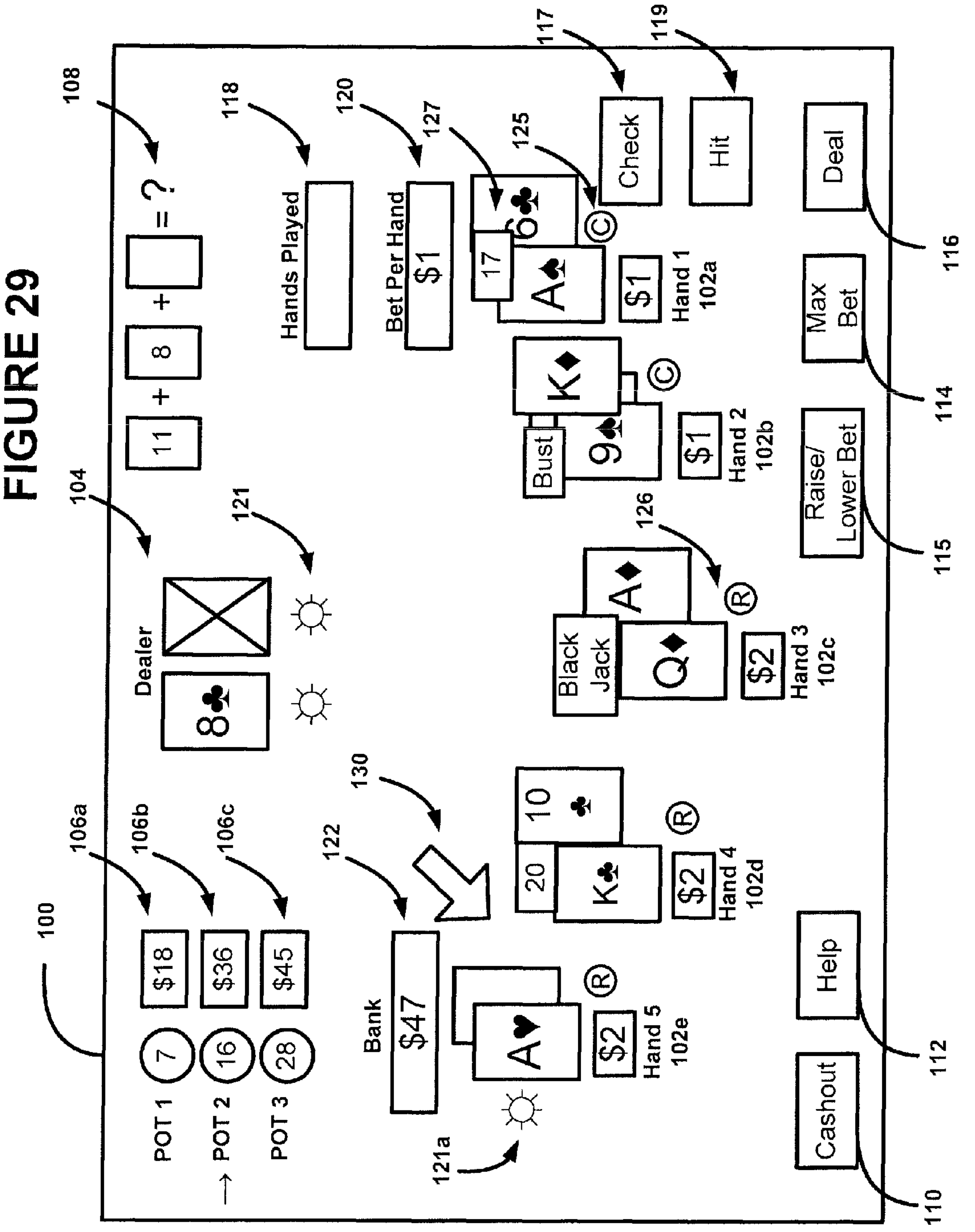
Figure 30:
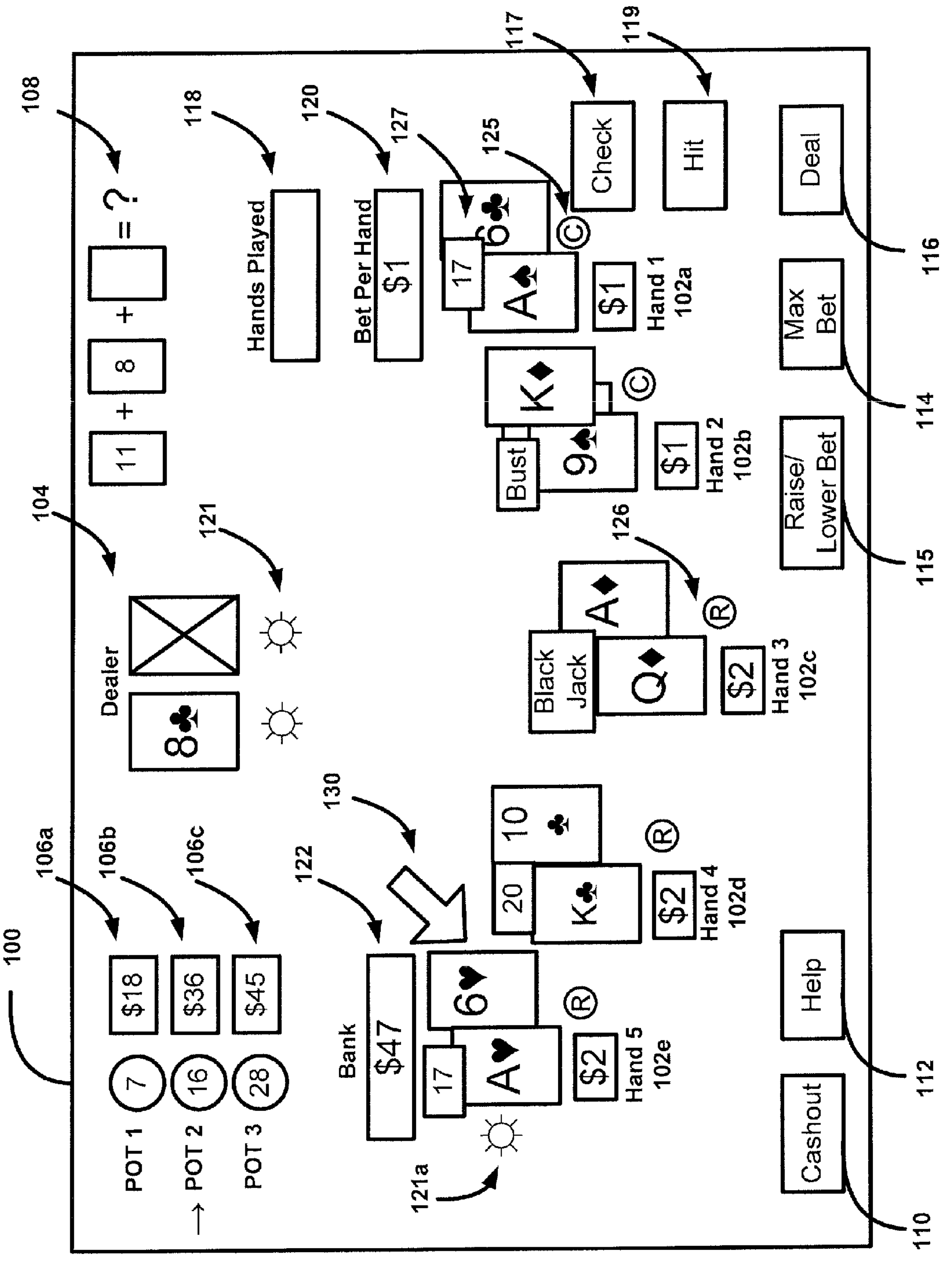

Game play on the fourth active hand ended with the player checking at 20. The system moves on to the final active hand (FIG. 29).

Figure 31:
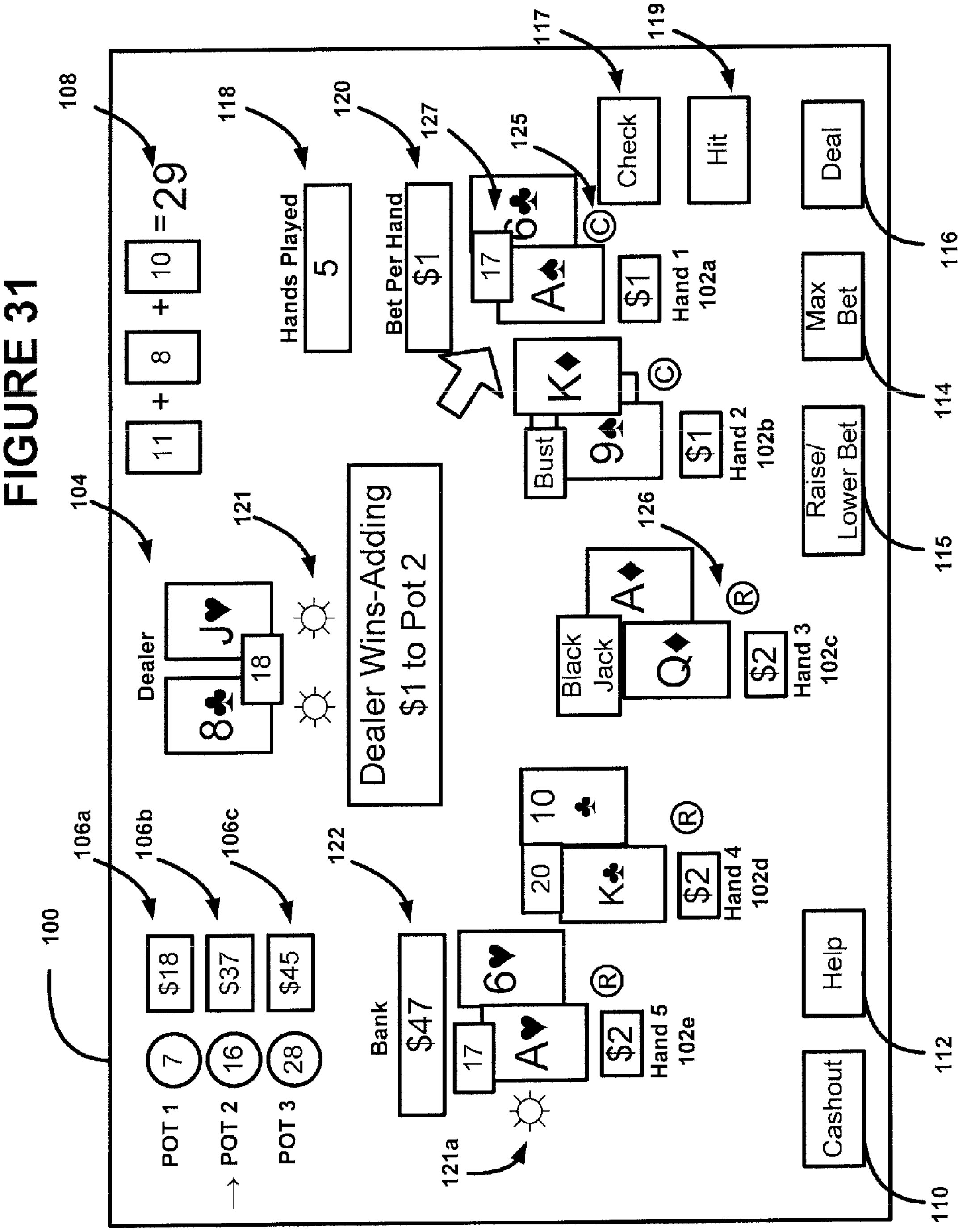

After the last active hand has been played (FIG. 30), the system reveals the dealer's second card (FIG. 31). The system then determines if the dealer stands or hits for additional cards (based on game math and rules).

Figure 33:
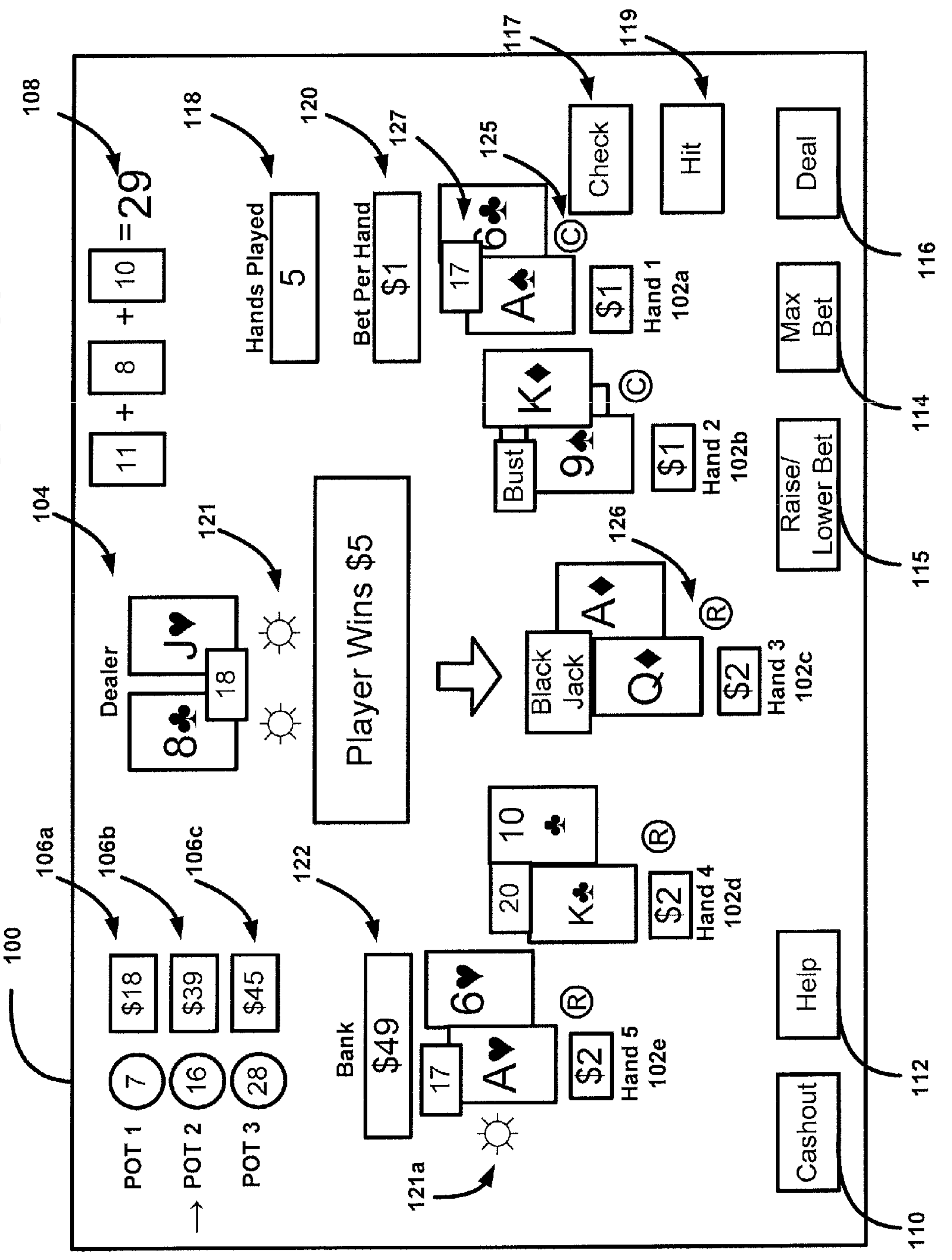

Each hand that beats the dealer's hand is awarded the corresponding win based on pre-determined pay out rules. Each of the active player hands that are beaten by the dealer adds the corresponding wager to the current active showdown pot (in this case showdown pot 2) (FIG. 33).

Figure 32:
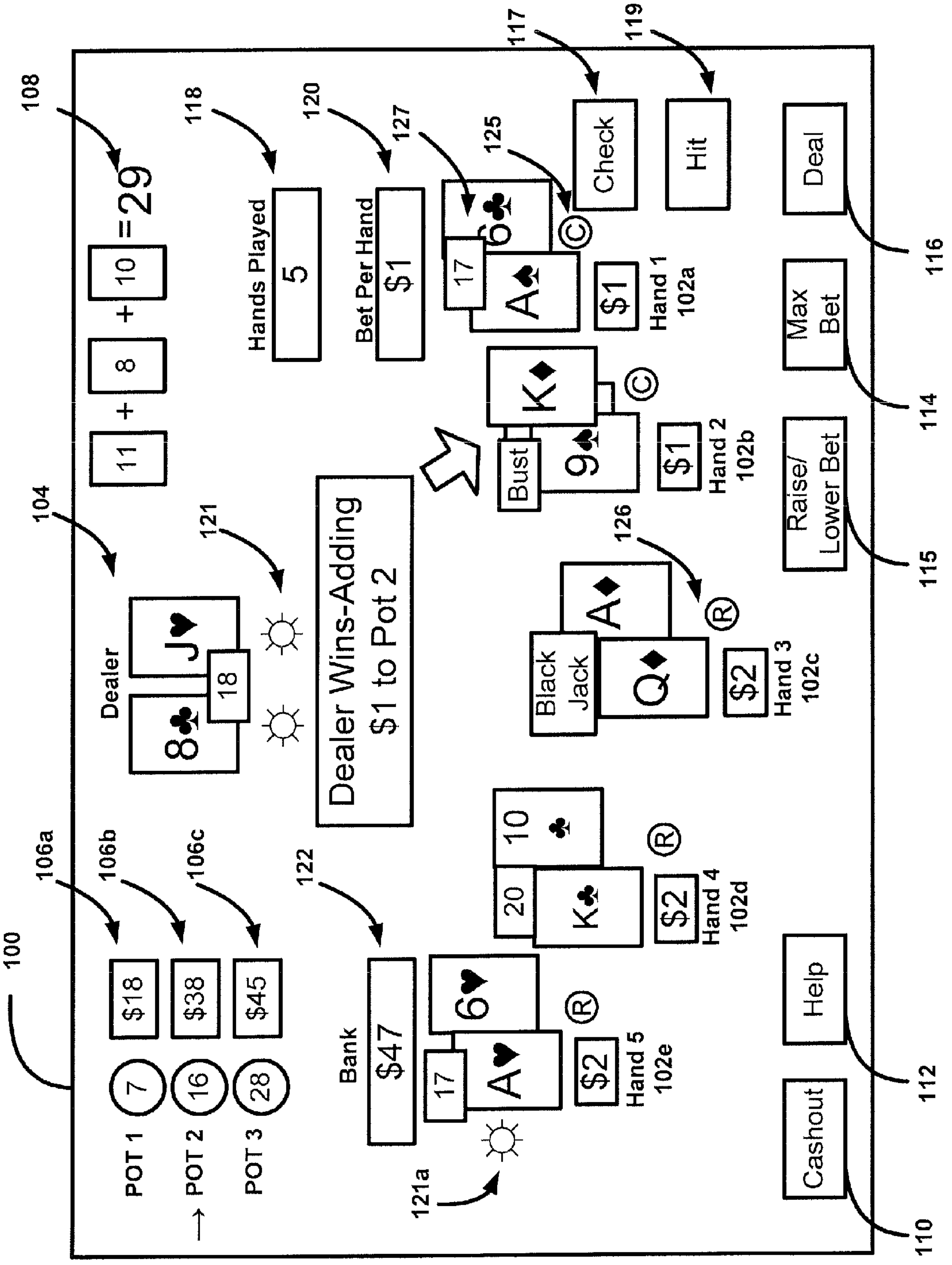

In this example, the first active hand is compared with the Dealer beating the player therefore the player's wager $1.00 is added to the active Pot (2) (FIG. 32). The system moves to the next hand for comparison.

The player's second active hand was a bust therefore the wager ($1.00) is added to the active pot (FIG. 32). The system moves to the next hand for comparison.

The player's third active hand was a Blackjack therefore the player is awarded a win amount based on the Blackjack payback. The win amount is awarded to the player's bank (FIG. 33). The system moves to the next hand for comparison and so on.

Once the dealer has completed their hand all active hands are compared one at time to the dealers (FIGS. 31-33). When all hands have been compared, the system checks to see if the player has qualified for one of the showdown pots.

Figure 33A:
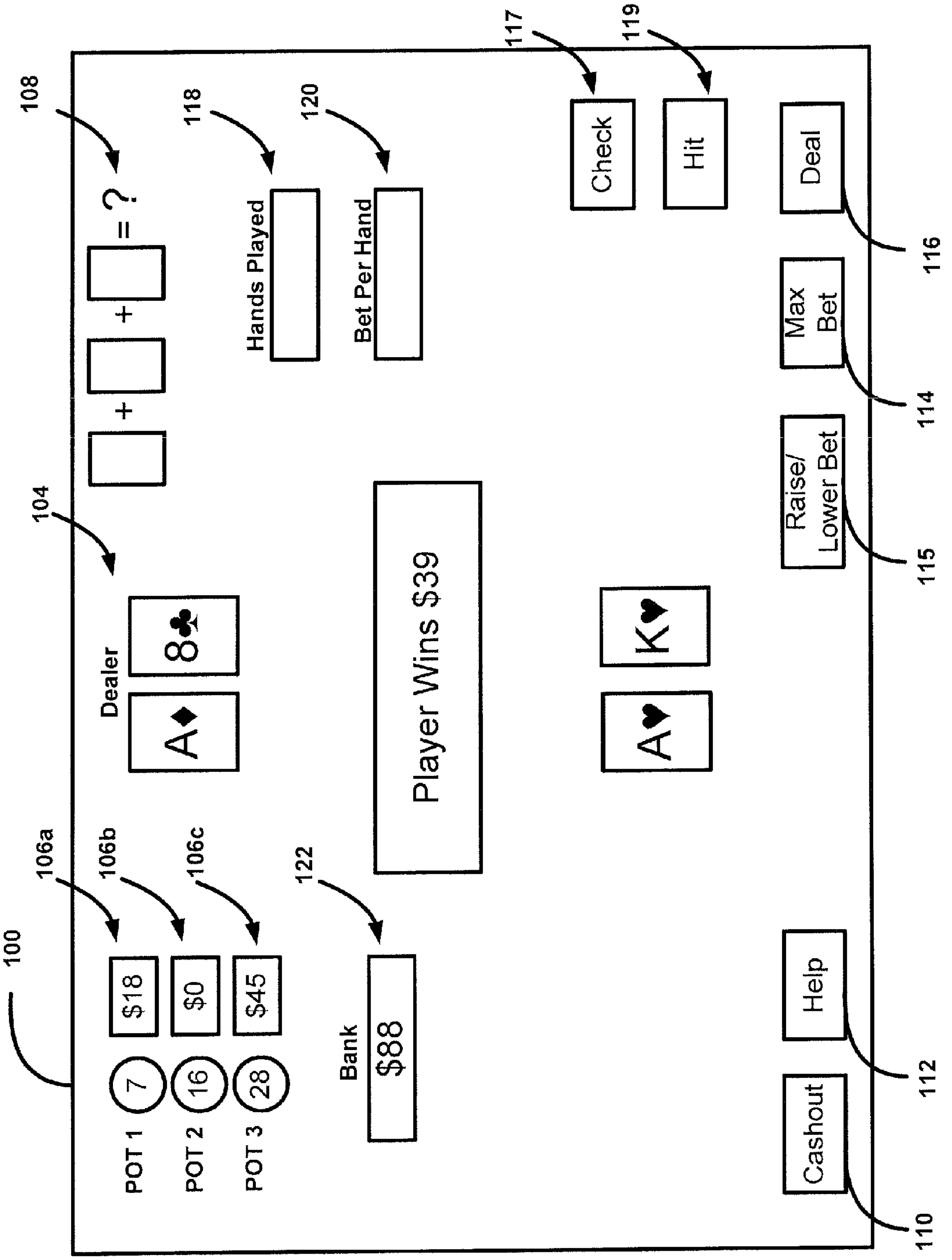

As shown in FIG. 33*a*, a showdown round was triggered and the player and dealer play a single game of blackjack for the highlighted showdown pot. In this case, the player beat the dealer (20 to 19) and the amount of the showdown pot was added to the player's credit.

As in other embodiments, various rules are followed during the showdown round such as:

Once the amount in the showdown pot is awarded, the showdown pot is cleared and the player is returned to the main game.

Whenever the player stands and the dealer busts, the amount accumulated in the showdown pot is awarded to the player. Once the amount in the pot is awarded the showdown pot is cleared and the player is returned to the main game.

If the dealer beats the player's hand without going over 21 or the player has busted, the amount accumulated in the showdown pot is cleared and reset to zero. Once the showdown pot is zeroed the player is returned to the main game.

If the both the player and dealer bust (exceed 21), the showdown pot is neither awarded nor cleared.

If the both the player and dealer have 21, the showdown pot is neither awarded nor cleared.

If both the player and dealer have tie hands (eg. 17 &17, 18 &18, . . . 21 & 21), the showdown pot is neither awarded nor cleared.

F-Caribbean Stud Poker

Another embodiment is shown in FIGS. 34-40. This embodiment is a variation of Caribbean Stud poker that allows the player to qualify both a pay table win if they beat the games pay table and qualify and play for one of the three accumulated pots whenever the sum of the dealers last three community cards match one of the randomly drawn pot numbers (6 to 33).

Game Play

The embodiment is described by way of example. In this embodiment, and as shown in FIG. 34, the display 200 includes a paytable 202, dealer card display 204, player card display 206, showdown pot display 208 with individual showdown pot displays 208*a*, 208*b*, 208*c* and showdown pot qualification display 210 as well as appropriate control buttons as described above.

Figure 34:
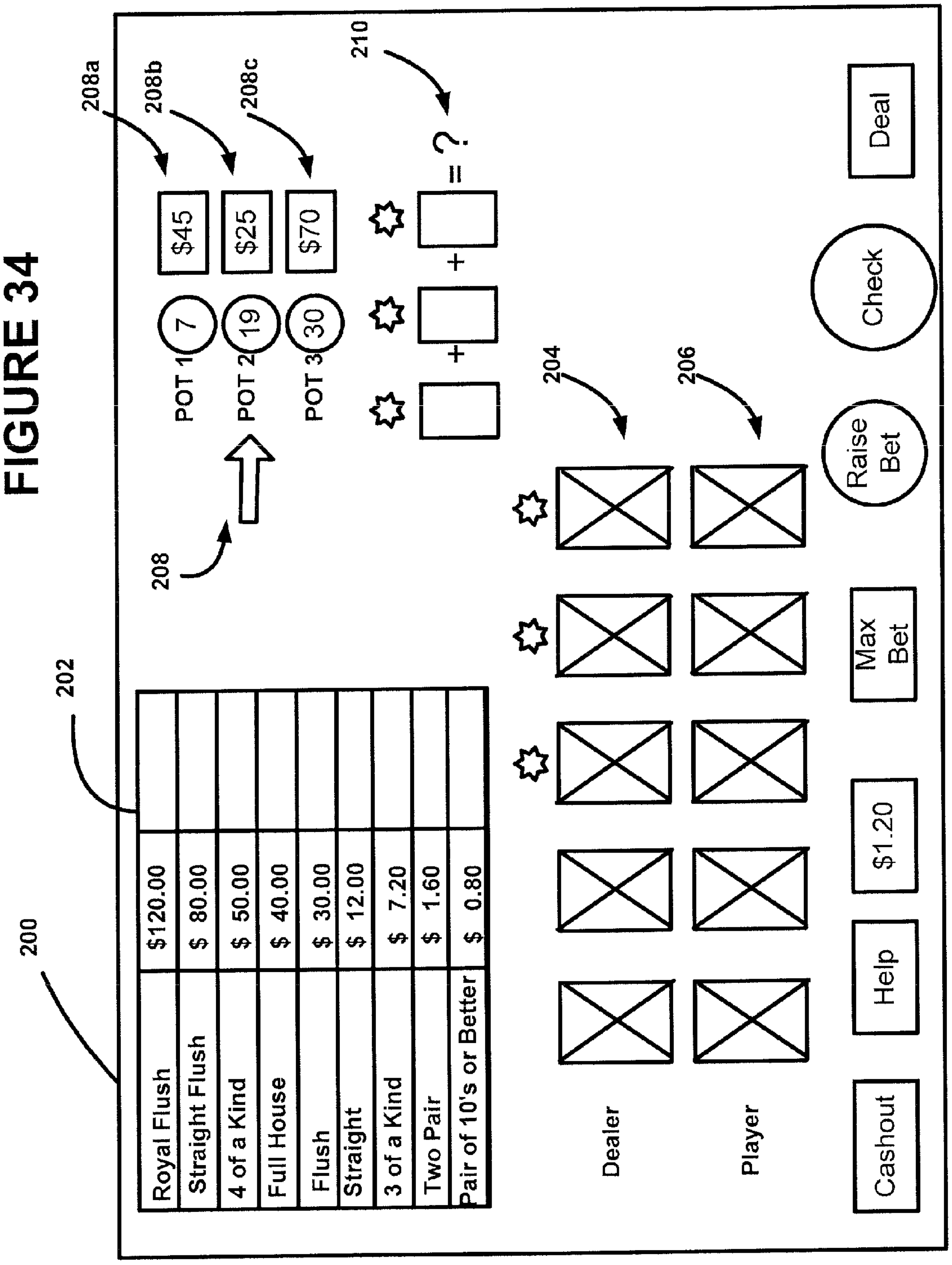
FIGS. 34-40 are representative displays of a game and game process in accordance with a "Caribbean Stud Poker" embodiment of the invention.

Play proceeds as follows:

The player makes an initial wager (FIG. 34). Once an initial wager is made the Deal button 66 is pressed and five cards are dealt face down to both the player and dealer (FIG. 34). The system also randomly generates three numbers from 6 to 33 and assigns one to each of the accumulating pot areas.

Figure 35:
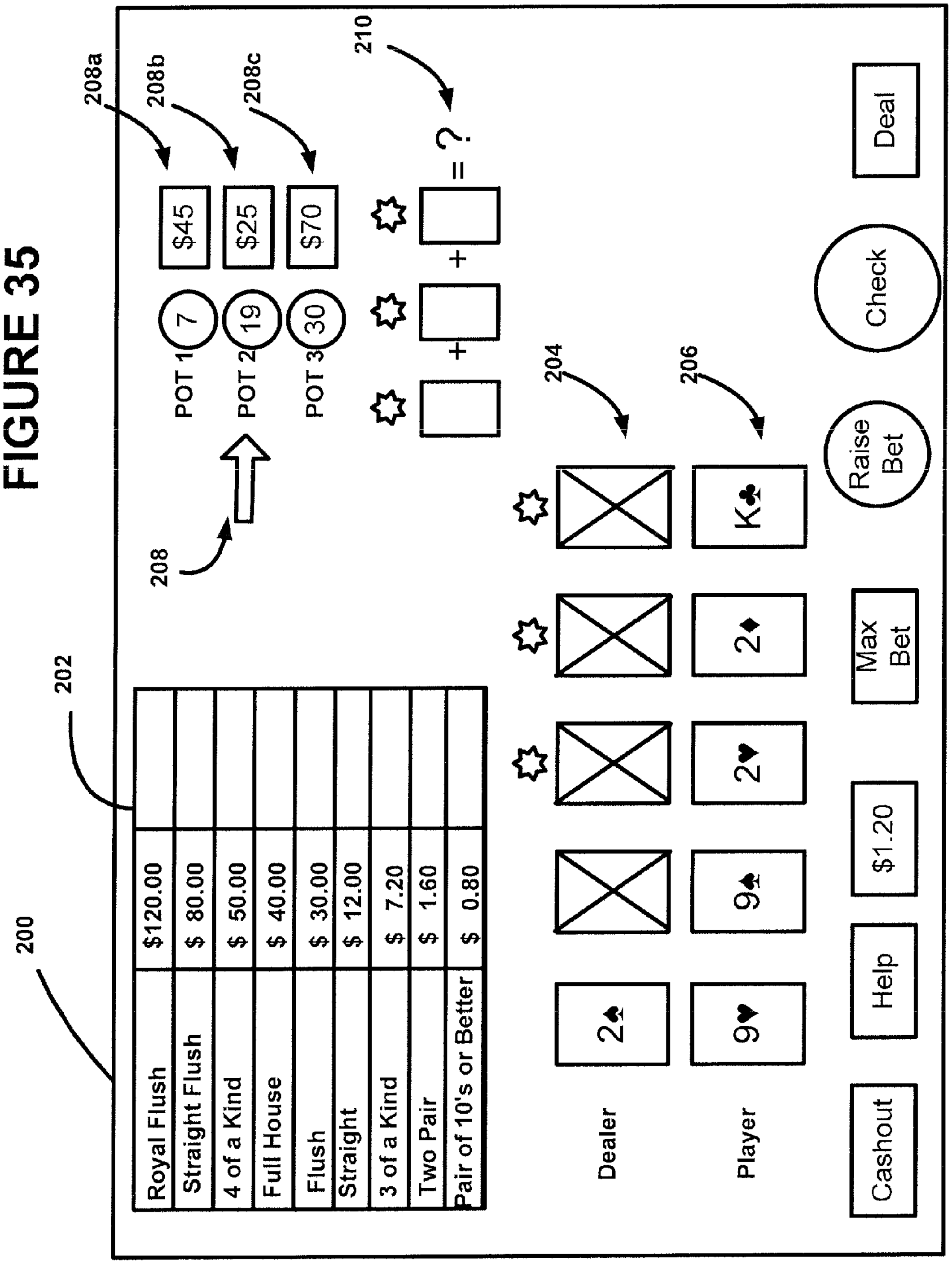

The player's five cards are flipped and revealed to the player as is the dealer's first hole card (FIG. 35). The player now has the option whether to raise their bet based on their five cards and the dealer's hole card or continues game play by pressing the Check button and continue game play with current bet.

Figure 36:
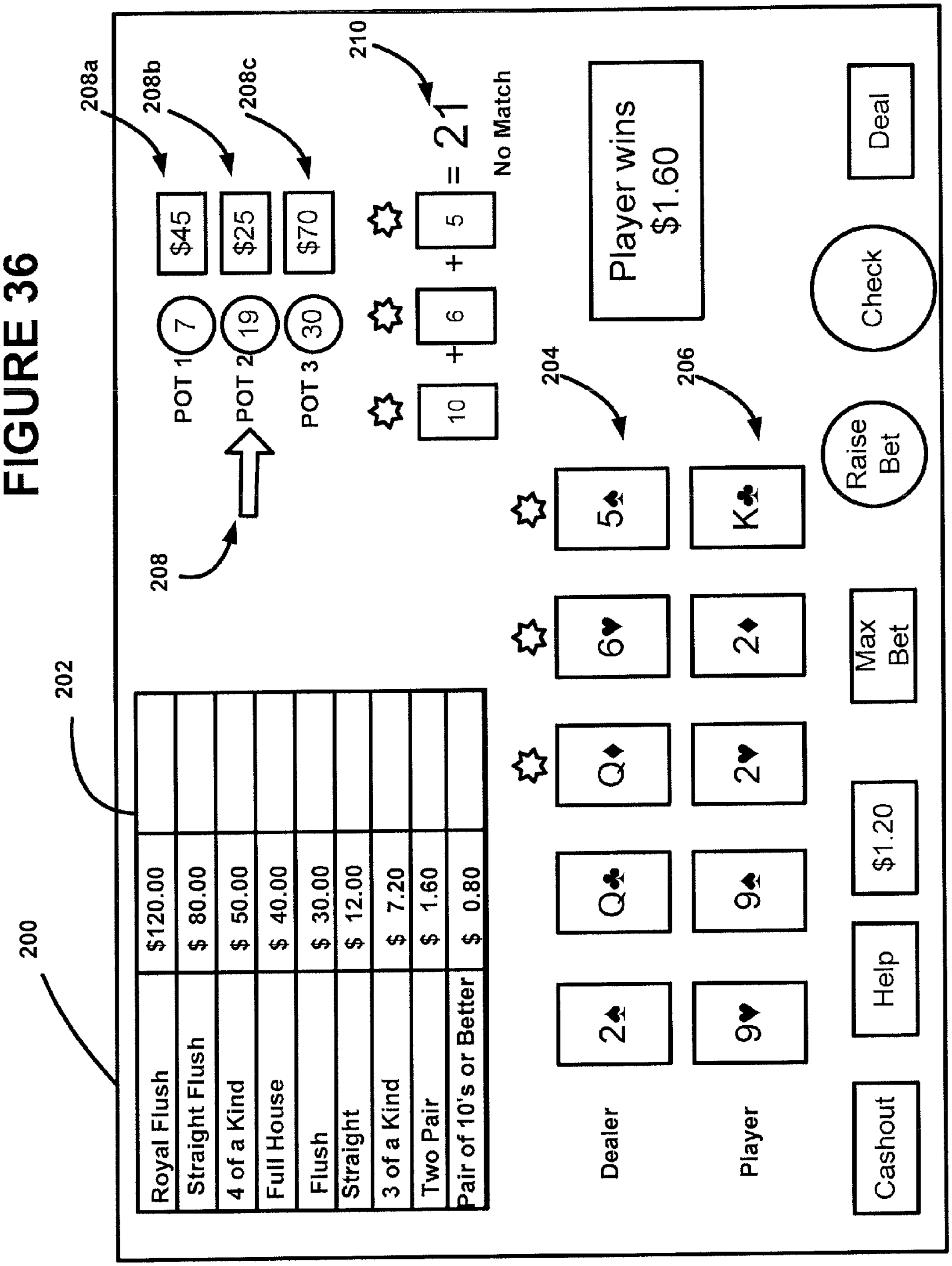
Figure 37:
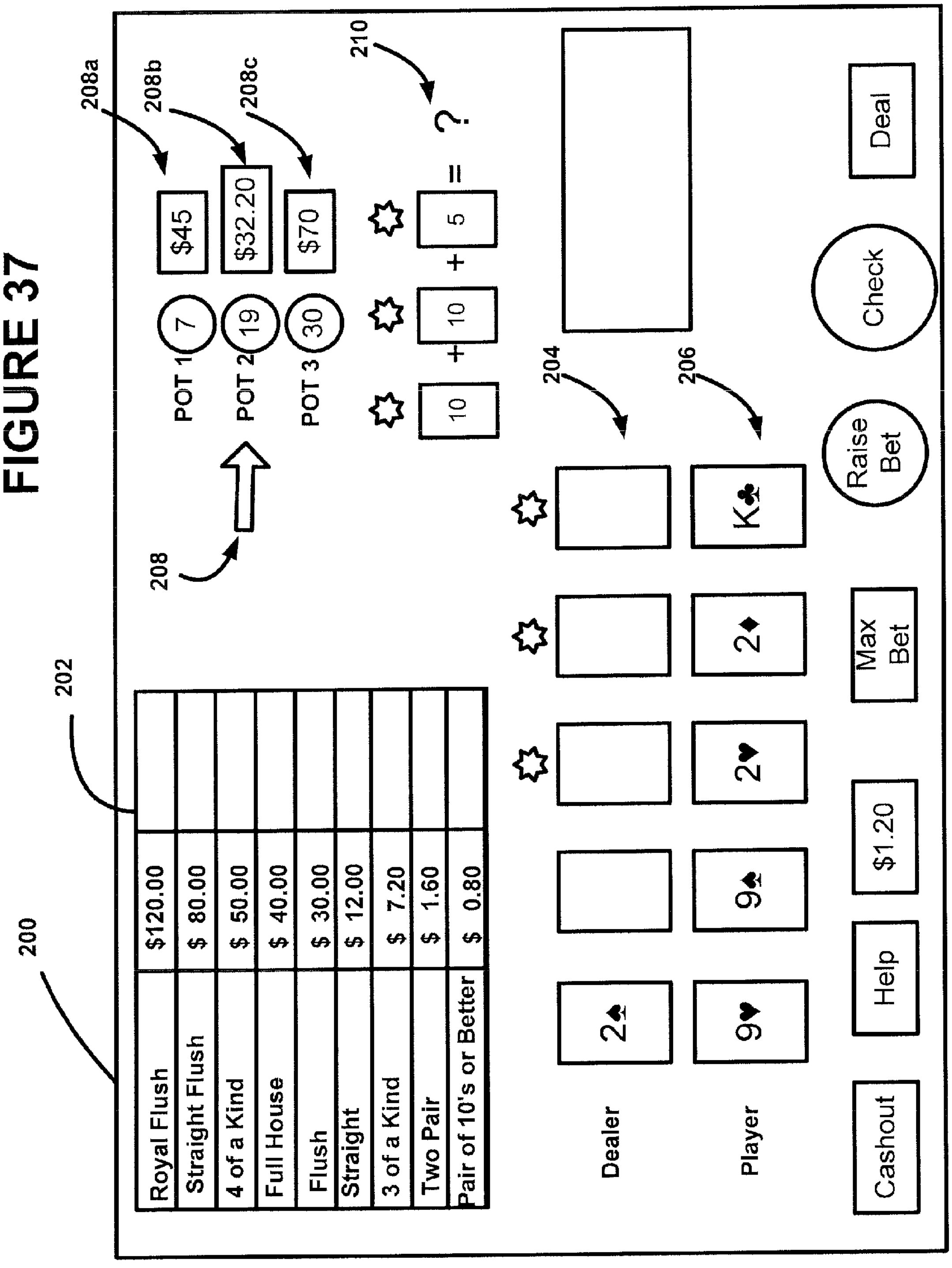
Figure 38:
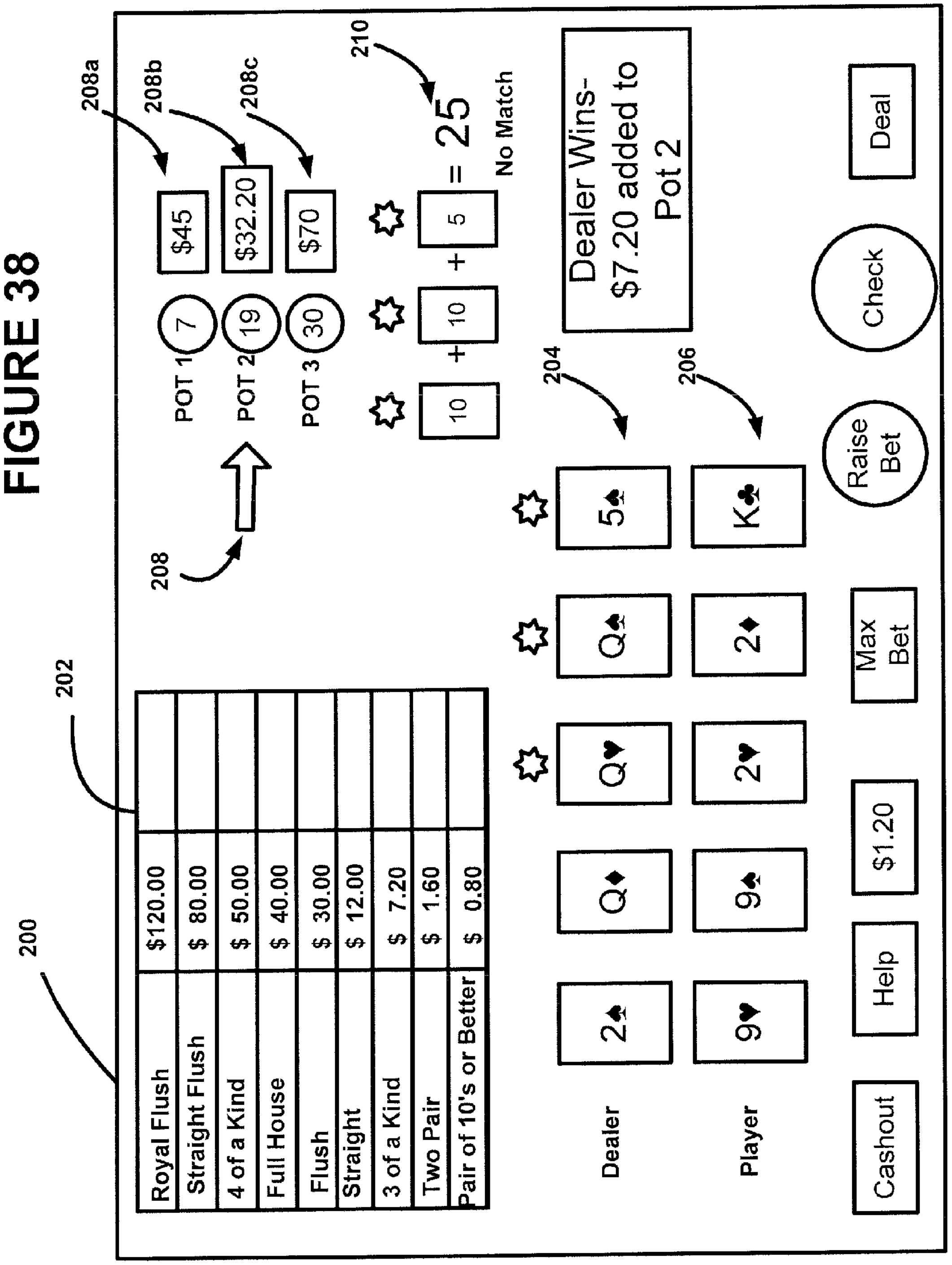

Pressing either the Raise bet (for example, doubles initial wager) or Check button continues game play and reveals the dealer's remaining four community cards (FIG. 36). Both hands are now compared between the Player and the Dealer to see who has the best hand. In this case, the player's hand wins (2 pair v. pair of Queens) and based on the pay table wins $3.20.

The system also checks to see if the sum of the dealer's last three cards matches one of the three numbers displayed in the showdown pot displays. In this case (FIG. 36), there was no match.

If the dealer has the best hand (FIGS. 37 and 38) the highlighted pay table amount is awarded to the active pot (1, 2 or 3). In this case, the dealer beat the player (3 Queens v. 2 pair) and based on the paytable, $7.20 was added to showdown pot 2.

In the event of a tie hand the dealer wins but no amount is awarded to the active pot.

Figure 39:
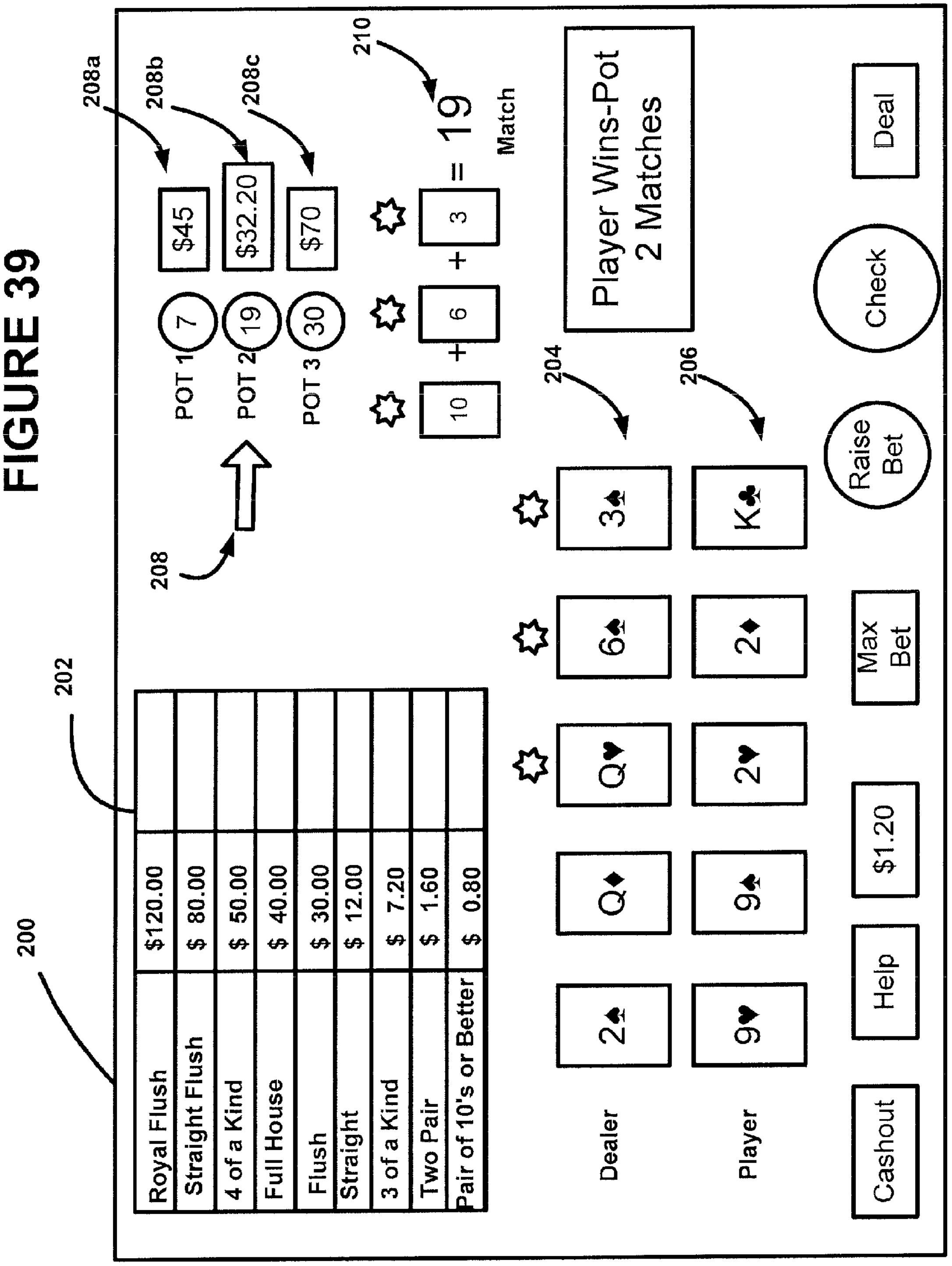

As shown in FIG. 39, the player qualifies for the showdown round when the sum of the dealer's last three cards matches the random number shown in the active showdown pot.

Figure 40:
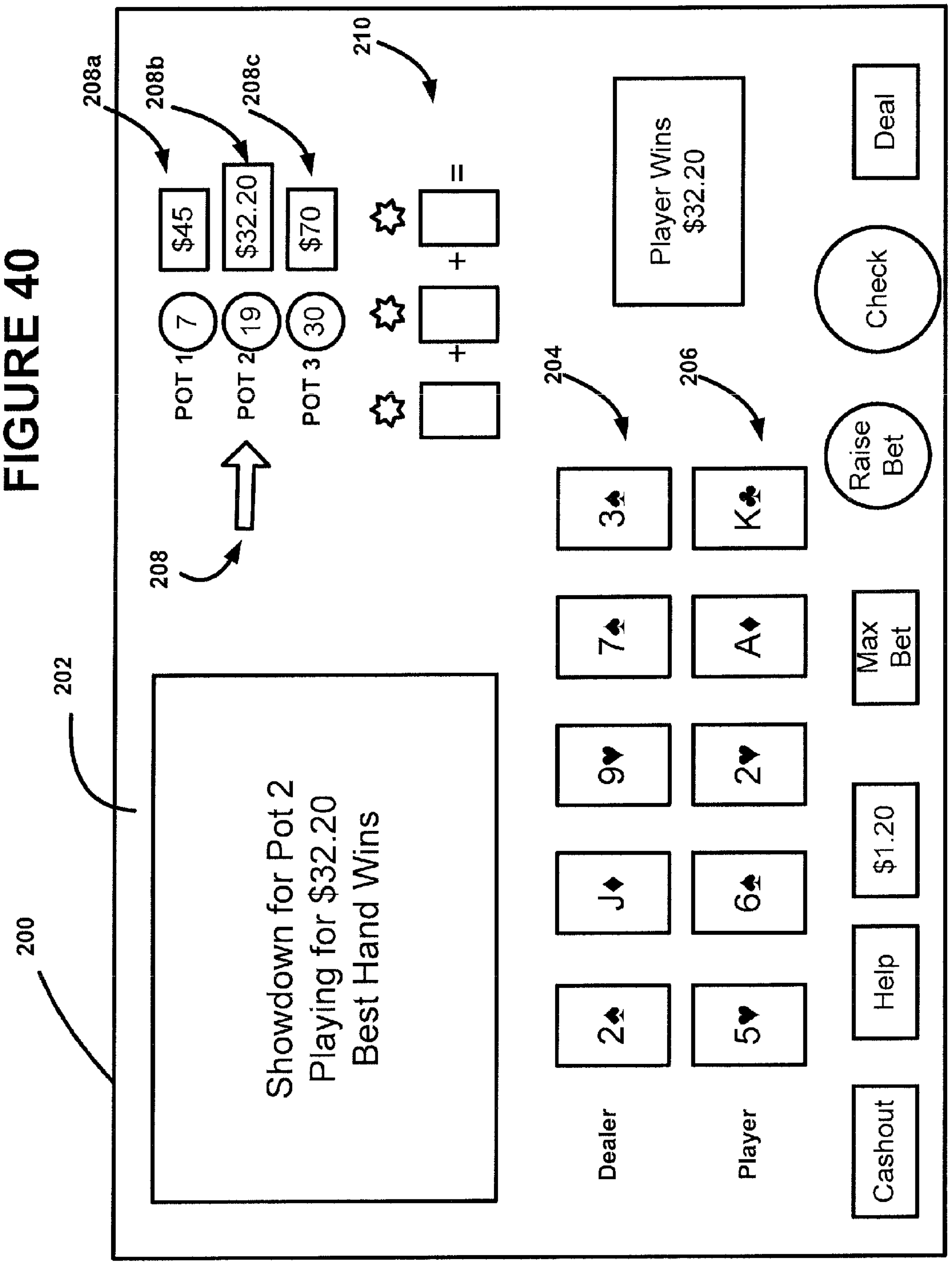

As shown in FIG. 40, in the showdown round, the player hand (two pair) has beat the Dealer's hand in the showdown round and the amount accumulated in the pot ($25.00) is awarded to the player. Once won, the pot is reset to zero and the player is returned to the regular game. In the event of a tie the amount in the pot is neither awarded nor cleared.

Networked Games

Figure 41:
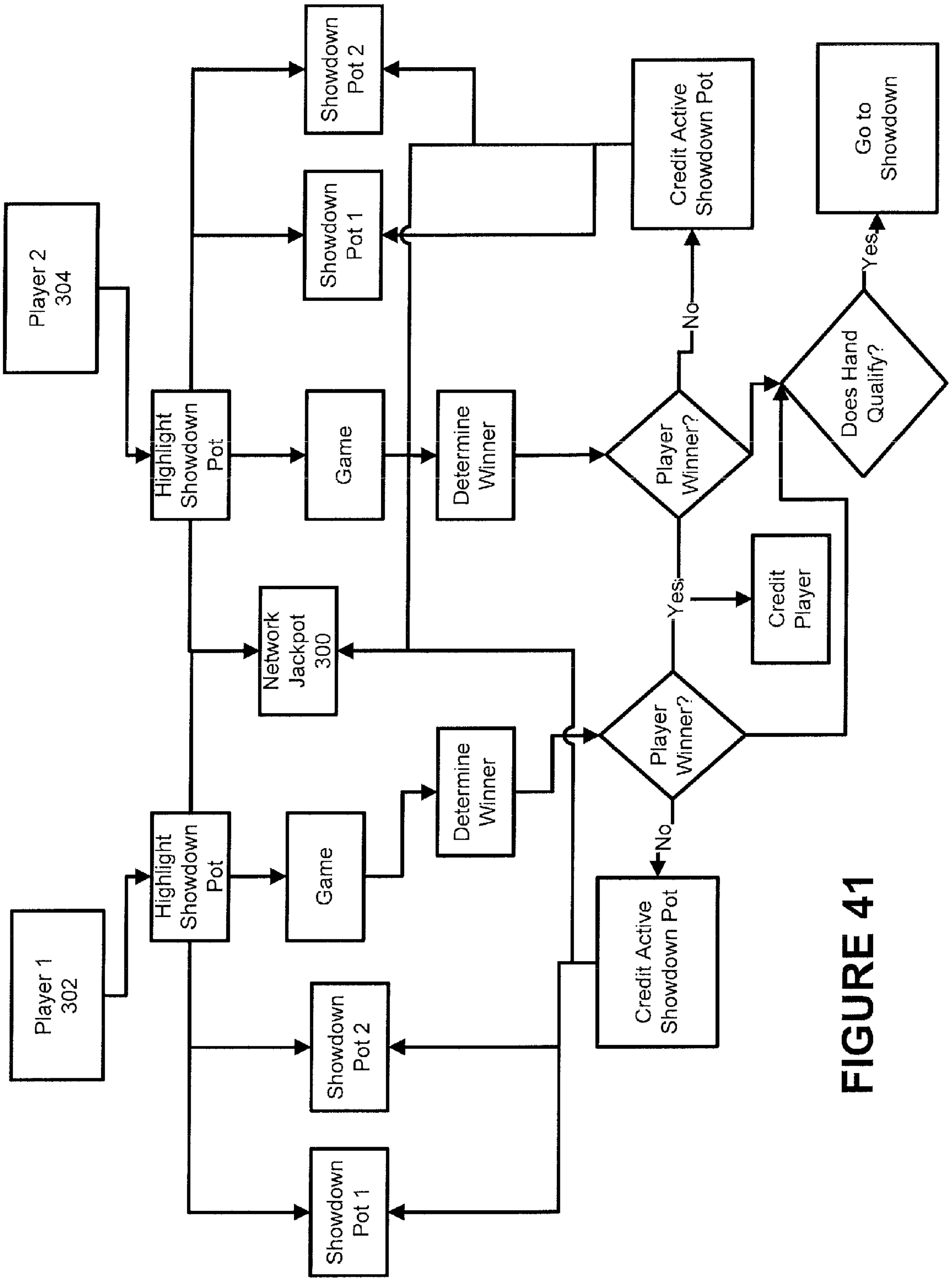
FIG. 41 is a flow chart showing a representative process of a networked gaming system in which players participate in a network jackpot in accordance with one embodiment of the invention.

In further embodiments, and with reference to FIG. 41, networked VLTs may contribute to a network jackpot 300 in which the players on individual VLTs 302, 304 can then gain access to and win the network jackpot.

By way of example, one of the showdown pots could be identified as a network jackpot that is highlighted at a regular frequency during regular game play. As in non-networked embodiments, in the event of a dealer win, the dealer's "win amount" would be added to the network jackpot and the amount in the network jackpot highlighted to all of the VLTs on that particular network.

Individual players on the network could qualify for a showdown round for the network jackpot in accordance with predetermined qualification criteria. The qualification criteria may be at a high or low threshold depending on the desired size of the network jackpot. For example, one may qualify for the network showdown pot only if the last three community cards are aces, such that the odds of qualification would be significantly lower than matching a single random number between 6 and 33 as described above. As a result, the relative frequency of dealer contributions to the network jackpot would be higher than in other embodiments resulting in a higher value showdown pot.

If a player at any one of the networked machines qualifies, showdown play would progress as described above.

Hardware

The invention may be deployed on various hardware including VLTs with touchscreens or VLTs having physical buttons independent to the screen or a combination of both.

It is understood that various modifications may be made to the systems and methods described above in accordance with the invention including but not limited to the use of other games not specifically described, the number of showdown pots, the access criteria for a showdown pot, pay table algorithms, computer displays and associated methods of displaying games, hardware that may be utilized to support the gaming systems and other variables not specifically identified herein.

The invention claimed is:

1. A gaming system enabling a player to play a betting game against a computer dealer, the system enabling gaming credits to accumulate in at least one bonus pot that the player may subsequently access during game play, the system comprising:

a computer game allowing a player to bet on the outcome of the betting game, the computer game having:

a gaming credit system that a) awards game credits to the player based on the outcome of a betting game during a first level of play; and b) awards gaming credits to a bonus pot based on the outcome of a betting game during a first level of play;

wherein a player may play for credits in one or more of the bonus pots by accessing a bonus round of play when the outcome of a first level of play matches pre-determined access criteria for the bonus round in accordance with a random number algorithm and wherein bonus pot credits are awarded to either the player or a house proprietor based on the outcome of the bonus round of play, wherein the number of bonus pots is greater than one and only one bonus pot may be accessed from one specific round of first level of play.

2. A gaming system as in claim 1 wherein the betting game is an electronic card game using a deck of cards.

3. A gaming system as in claim 2 wherein the pre-determined access criteria to the bonus round of play is based on matching numbers or symbols of specific cards played during the first round of play with a randomly selected pattern or mathematical total of card values determined by the computer system.

4. A gaming system as in claim 1 wherein the gaming credits awarded to the bonus pot is based on the total amount bet during the first level of play and a paytable.

5. A gaming system as in claim 4 wherein gaming credits are awarded to the bonus pot if the computer dealer wins the first level of play.

6. A gaming system as in claim 1 wherein the bonus round of play is the same game as the first level of play.

7. A gaming system as in claim 1 wherein the bonus round of play does not include betting.

8. A gaming system as in claim 1 wherein, if the player wins the bonus round of play, the credits in the bonus pot are awarded to the player and the bonus pot is cleared of credits.

9. A gaming system as in claim 1 wherein if the dealer wins the bonus round of play, the credits in the bonus pot are awarded to the house and the bonus pot is cleared of credits.

10. A gaming system as in claim 1 wherein the computer game allows at least two betting rounds during the first round of play.

11. A gaming system as claim 1 wherein the game is a poker game.

12. A gaming system as in claim 1 wherein the game is a blackjack game.

13. A gaming system as in claim 12 wherein the gaming system enables a player to play multiple hands of blackjack.

14. A gaming system as in claim 1 enabling a plurality of players to independently play the computer game on a network on separate computer systems and wherein the system further includes a network jackpot accessible to all players on the network based on network jackpot access criteria.

15. A gaming system as in claim 14 wherein the network jackpot access criteria is statistically more difficult to meet during a first round of play than bonus pot access criteria during a first round of play.

16. A gaming system as in claim 1 wherein the computer game is Texas Hold 'em poker.

17. A gaming system as in claim 1 wherein the computer game is Let it Ride poker.

18. A gaming system as in claim 1 wherein the computer game is Three Card poker.

19. A gaming system as in claim 1 wherein the computer game is Omaha poker.

20. A gaming system as in claim 1 wherein the computer game is Caribbean stud poker.

21. A method enabling a player to play a betting game against a computer dealer on a computer system to accumulate game credits in at least one bonus pot that the player may subsequently access comprising the steps of:

a. enabling a player to play a betting game and bet on the outcome of the betting game on a computer;

b. awarding game credits to the player and the at least one bonus pot based on pre-determined odds for different game outcomes during a first level of play;

c. enabling a player to play for game credits in one or more of the at least one bonus pots by accessing a bonus round of play when the outcome of a first level round of play matches pre-determined access criteria for the bonus round of play in accordance with a random number algorithm d. awarding bonus pot game credits to the player or a house proprietor based on the outcome of the bonus round of play, wherein the number of bonus pots is greater than one and only one bonus pot may be accessed from one specific round of first level of play.

22. A gaming system method enabling a player to play a betting game against a computer dealer on a computer, the system enabling gaming credits to accumulate in at least one bonus pot that the player may subsequently access during game play, the method comprising the steps of:

a) providing a computer game allowing a player to bet on the outcome of the betting game, the computer game having a gaming credit system;

b) awarding gaming credits to the player based on the outcome of a betting game during a first level of play;

c) awarding gaming credits to a bonus pot based on the outcome of a betting game during a first level of play;

d) enabling a player to play for gaming credits in one or more of the bonus pots by accessing a bonus round of play when the outcome of a first level of play matches pre-determined access criteria for the bonus round in accordance with a random number algorithm;

e) awarding bonus pot credits to either the player or a house proprietor based on the outcome of the bonus round of play, wherein the gaming credits awarded to the bonus pot are based on the total amount bet during the first level of play and a paytable.

23. A gaming system method as in claim 22 wherein the betting game is an electronic card game using a deck of cards.

24. A gaming system method as in claim 23 wherein the pre-determined access criteria to the bonus round of play is based on matching numbers or symbols of specific cards played during the first round of play with a randomly selected pattern or mathematical total of card values determined by the computer.

25. A gaming system method as in claim 22 wherein the number of bonus pots is greater than one and only one bonus pot may be accessed from one specific round of first level of play.

26. A gaming system method as in claim 22 wherein gaming credits are awarded to the bonus pot if the computer dealer wins the first level of play.

27. A gaming system method as in claim 22 wherein the bonus round of play is the same game as the first level of play.

28. A gaming system method as in claim 22 wherein the bonus round of play does not include betting.

29. A gaming system method as in claim 22 wherein, if the player wins the bonus round of play, the credits in the bonus pot are awarded to the player and the bonus pot is cleared of credits.

30. A gaming system method as in claim 22 wherein if the dealer wins the bonus round of play, the credits in the bonus pot are awarded to the house and the bonus pot is cleared of credits.

31. A gaming system as in claim 22 wherein the computer game allows at least two betting rounds during the first round of play.

32. A gaming system method as in claim 22 wherein the game is a poker game.

33. A gaming system as in claim 22 wherein the game is a blackjack game.

34. A gaming system as in claim 33 wherein the gaming system enables a player to play multiple hands of blackjack.

35. A gaming system method as in claim 22 comprising the further step of enabling a plurality of players to independently play the computer game on a network on separate computer systems and wherein the system further includes a network jackpot accessible to all players on the network based on network jackpot access criteria.

36. A gaming system method as in claim 22 wherein the network jackpot access criteria is statistically more difficult to meet during a first round of play than bonus pot access criteria during a first round of play.

37. A gaming system method as in claim 22 wherein the computer game is Texas Hold 'em poker.

38. A gaming system method as in claim 22 wherein the computer game is Let it Ride poker.

39. A gaming system method as in claim 22 wherein the computer game is Three Card poker.

40. A gaming system method as in claim 22 wherein the computer game is Omaha poker.

41. A gaming system method as in claim 22 wherein the computer game is Caribbean stud poker.

42. A gaming system enabling a player to play a betting game against a computer dealer, the system enabling gaming credits to accumulate in at least one bonus pot that the player may subsequently access during game play, the system comprising:

a computer game allowing a player to bet on the outcome of the betting game, the computer game having:

a gaming credit system that a) awards game credits to the player based on the outcome of a betting game during a first level of play; and b) awards gaming credits to a bonus pot based on the outcome of a betting game during a first level of play;

wherein a player may play for credits in one or more of the bonus pots by accessing a bonus round of play when the outcome of a first level of play matches pre-determined access criteria for the bonus round in accordance with a random number algorithm and wherein bonus pot credits are awarded to either the player or a house proprietor based on the outcome of the bonus round of play, and wherein the gaming credits awarded to the bonus pot are based on the total amount bet during the first level of play and a paytable and the gaming credits are awarded to the bonus pot if the computer dealer wins the first level of play.

43. A gaming system enabling a player to play a betting game against a computer dealer, the system enabling gaming credits to accumulate in at least one bonus pot that the player may subsequently access during game play, the system comprising:

a computer game allowing a player to bet on the outcome of the betting game, the computer game having:

a gaming credit system that a) awards game credits to the player based on the outcome of a betting game during a first level of play; and b) awards gaming credits to a bonus pot based on the outcome of a betting game during a first level of play;

wherein a player may play for credits in one or more of the bonus pots by accessing a bonus round of play when the outcome of a first level of play matches pre-determined access criteria for the bonus round in accordance with a random number algorithm and wherein bonus pot credits are awarded to either the play or a house proprietor based on the outcome of the bonus round of play, and wherein the system is enabled to allow a plurality of players to independently play the computer game on a network on separate computer systems and wherein the system further includes a network jackpot accessible to all players on the network based on network jackpot access criteria; and wherein the network jackpot access criteria is statistically more difficult to meet during a first round of play than bonus pot access criteria during a first round of play.

44. A gaming system method enabling a player to play a betting game against a computer dealer on a computer, the system enabling gaming credits to accumulate in at least on bonus pot that the player may subsequently access during game play, the method comprising the steps of:

a) providing a computer game allowing a player to bet on the outcome of the betting game, the computer game having a gaming credit system;

b) awarding gaming credits to the player based on the outcome of a betting game during a first level of play;

c) awarding gaming credits to a bonus pot based on the outcome of a betting game during a first level of play;

d) enabling a player to play for gaming credits in one or more of the bonus pots by accessing a bonus round of play when the outcome of a first level of play matches pre-determined access criteria for the bonus round in accordance with a random number algorithm;

e) awarding bonus pot credits to either the player or a house proprietor based on the outcome of the bonus round of play, wherein the network jackpot access criteria is statistically more difficult a meet during a first round of play than bonus pot access criteria during a first round of play.

* * * * *